United States Patent
Ohba et al.

(10) Patent No.: US 8,976,216 B2
(45) Date of Patent: Mar. 10, 2015

(54) LIGHT SOURCE UNIT, OPTICAL SCANNING DEVICE, AND IMAGE FORMING APPARATUS

(75) Inventors: Yoshihiro Ohba, Miyagi (JP); Satoru Sugawara, Miyagi (JP); Toshihiro Ishii, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 967 days.

(21) Appl. No.: 13/090,654

(22) Filed: Apr. 20, 2011

(65) Prior Publication Data
US 2011/0267415 A1 Nov. 3, 2011

(30) Foreign Application Priority Data

Apr. 28, 2010 (JP) ................................. 2010-103074
Feb. 22, 2011 (JP) ................................. 2011-035380

(51) Int. Cl.
| | |
|---|---|
| B41J 2/385 | (2006.01) |
| G01D 15/06 | (2006.01) |
| G03G 15/01 | (2006.01) |
| B41J 2/47 | (2006.01) |
| G02B 5/00 | (2006.01) |
| G02B 26/12 | (2006.01) |
| B41J 2/455 | (2006.01) |

(52) U.S. Cl.
CPC ................. *B41J 2/473* (2013.01); *G02B 5/005* (2013.01); *G02B 26/124* (2013.01); *B41J 2/455* (2013.01)
USPC ............................ 347/238; 347/118; 347/119

(58) Field of Classification Search
USPC ....................................................... 347/238
See application file for complete search history.

(56) References Cited

U.S. PATENT DOCUMENTS

| | | | |
|---|---|---|---|
| 6,975,663 B2 | 12/2005 | Sekiya et al. | |
| 7,002,527 B2 | 2/2006 | Sugawara | |
| 7,245,647 B2 | 7/2007 | Jikutani et al. | |
| 7,619,796 B2 | 11/2009 | Imai | |
| 2006/0093010 A1 | 5/2006 | Sekiya et al. | |
| 2007/0030874 A1 | 2/2007 | Ariga et al. | |
| 2007/0253047 A1* | 11/2007 | Ichii et al. ...................... 359/204 |
| 2008/0025759 A1* | 1/2008 | Ichii et al. ...................... 399/178 |
| 2008/0123159 A1 | 5/2008 | Hayashi et al. | |
| 2008/0267662 A1 | 10/2008 | Arai et al. | |
| 2009/0285252 A1 | 11/2009 | Ishii et al. | |
| 2009/0285602 A1 | 11/2009 | Harasaka et al. | |
| 2009/0295902 A1 | 12/2009 | Sato et al. | |
| 2009/0310632 A1 | 12/2009 | Sugawara et al. | |

FOREIGN PATENT DOCUMENTS

| | | |
|---|---|---|
| JP | 2004-109588 | 4/2004 |
| JP | 2005-86027 | 3/2005 |
| JP | 2005-252032 | 9/2005 |

(Continued)

OTHER PUBLICATIONS

Japanese official action dated May 29, 2014 in corresponding Japanese patent application No. 2011-035380.

*Primary Examiner* — Uyen Chau N Le
*Assistant Examiner* — John M Bedtelyon
(74) *Attorney, Agent, or Firm* — Cooper & Dunham LLP

(57) ABSTRACT

A light source unit includes a surface-emitting laser array including light emitting units; and an apertured member provided on a light path of light beams emitted from the surface-emitting laser array, the apertured member including an aperture. In at least one direction, an intensity distribution of interference patterns caused by the light beams passing through the aperture includes an equal number of crests and troughs.

19 Claims, 23 Drawing Sheets

(56) References Cited

FOREIGN PATENT DOCUMENTS

| JP | 2007-103576 | 4/2007 |
|---|---|---|
| JP | 2008-129490 | 6/2008 |
| JP | 2008-268683 | 11/2008 |
| JP | 2009-40031 | 2/2009 |
| JP | 2009-58779 | 3/2009 |
| JP | 2009-217077 | 9/2009 |

* cited by examiner

FIG.4
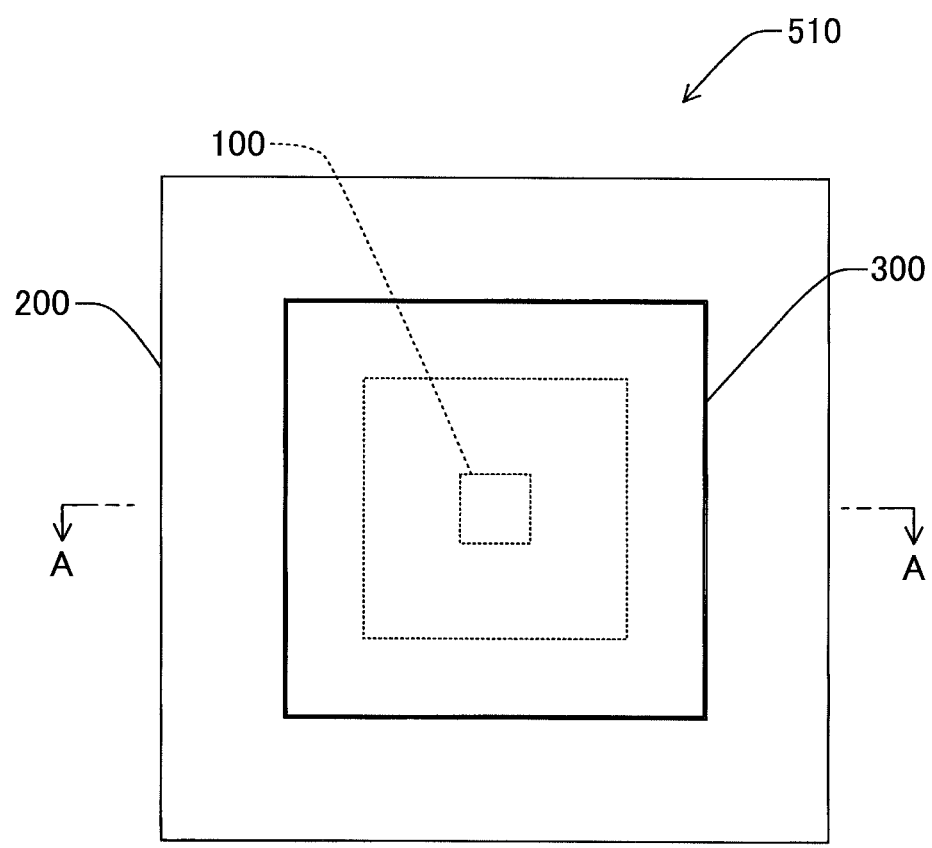
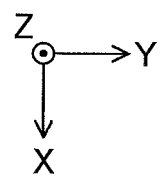

FIG.5
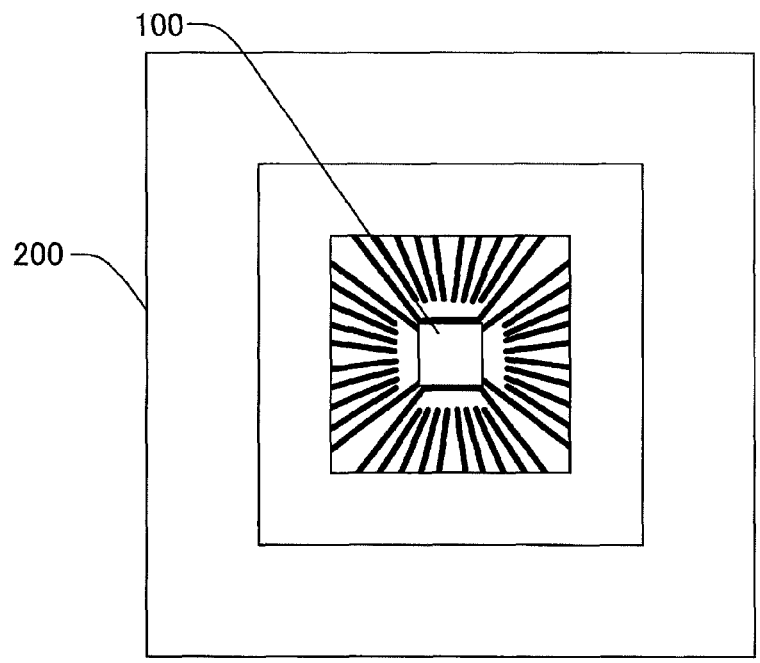
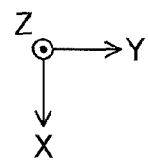
FIG.6
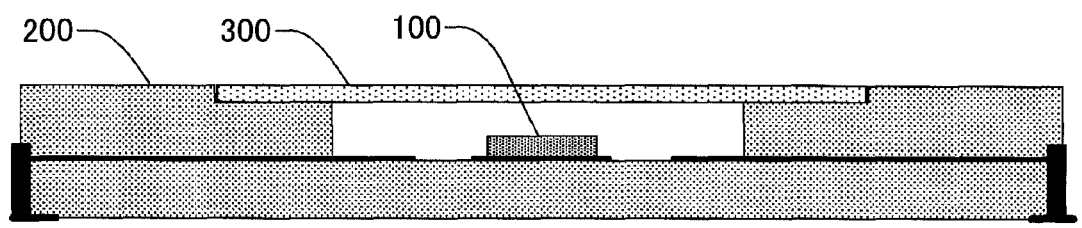
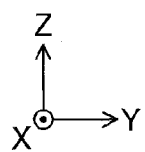

dx1<dx2
dy1<dy2

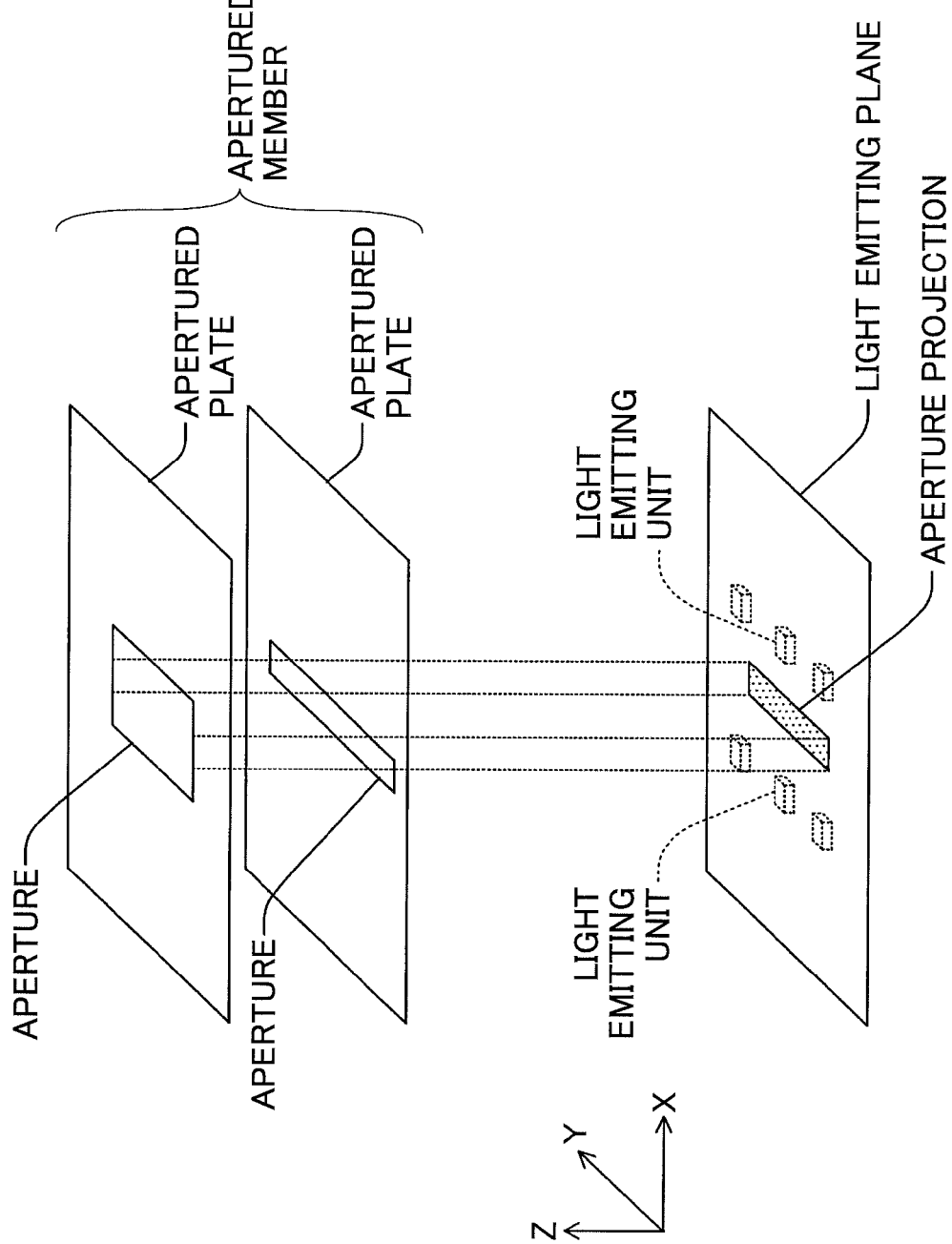

LIGHT SOURCE UNIT, OPTICAL SCANNING DEVICE, AND IMAGE FORMING APPARATUS

BACKGROUND OF THE INVENTION

1. Field of the Invention

The present invention relates to a light source unit, an optical scanning device, and an image forming apparatus, and more particularly to a light source unit for emitting plural light beams, an optical scanning device including the light source unit, and an image forming apparatus including the optical scanning device.

2. Description of the Related Art

A Vertical Cavity Surface Emitting Laser (hereinafter, also referred to as a "VCSEL") is for outputting light in a vertical direction to a surface of a substrate. The VCSEL is advantageous over a semiconductor laser element of an end face light-emitting type that emits light in a direction parallel to the substrate surface, because the VCSEL is low cost and high performance and arrays can be easily formed with VCSEL.

Furthermore, there are high expectations for using VCSEL as a light source for optical communications such as optical interconnections, a light source for optical pickup, and a light source for an image forming apparatus such as a laser printer. Therefore, research and development relevant to VCSEL are actively implemented, and some of the results of R & D are put into practical use.

Generally, in an optical system using VCSEL as a light source, light emitted from the light source is reflected by lenses and glass in the optical system, and may return to the light source. Because of the light that has returned to the light source (returning light), the laser oscillation in the VCSEL becomes unstable, and the amount of light emitted from the light source varies in an irregular manner over time. The amount of light may vary in nano-second order or micro-second order.

The stability in the amount of light emitted from the light source is an important property when the VCSEL is applied to image forming and communications.

Depending on the image forming apparatus, even a slight percent of variation in the amount of light may lead to serious problems. Thus, high-quality images cannot be formed with a light source that emits unstable amounts of light. In communication applications, if the light source emits unstable amounts of light, signal transmission properties become degraded and optical communications cannot be performed with good performance.

Therefore, various methods have been proposed, such as a method of increasing resistance to returning light (see, for example, patent document 1), or a method of reducing returning light (see, for example, patent documents 2 and 3).

Patent document 1 discloses a surface-emitting laser element in which a resonator is formed by a lower multilayer film reflection mirror and an upper multilayer film reflection mirror. An active layer is placed between the lower multilayer film reflection mirror and the upper multilayer film reflection mirror. The relaxation oscillation frequency at a bias point in the resonator is set so as to exceed the optical communications frequency that modulates laser beams output from the surface-emitting laser element.

Patent document 2 discloses a surface-emitting semiconductor laser including a semiconductor substrate, an active layer provided above the semiconductor substrate, an emitting surface provided above the active layer for emitting laser beams generated at the active layer in a direction vertical to the semiconductor substrate, and an absorption layer provided above the emitting surface for absorbing part of the laser beams.

Patent document 3 discloses a surface-emitting laser module having at least a surface-emitting laser chip and a monitoring photo-detector mounted on a TO header. The surface-emitting laser module has a cap with a window coated by a film having a predetermined transmittance (less than or equal to 40%).

However, when a surface-emitting laser array and an apertured plate are used in combination, the methods disclosed in patent documents 1 through 3 may have the following problem. Specifically, the amount of light that is emitted from the surface-emitting laser array and then passed through the apertured plate may not be stabilized.

Inventors of the present invention made various studies regarding a device including a surface-emitting laser array having plural light emitting units as a light source, and an optical system including an apertured plate having an aperture for adjusting the light beams emitted from the light source. Accordingly, it was found that the variation in the amount of light passing through the aperture is not only affected by light that is emitted from light emitting units and then returns to the same light emitting units as known conventionally. It was found that the variation in the amount of light is also affected by light that returns from other light emitting units.

The variation in the amount of light passing through the aperture, which is caused by light returning from other light emitting units, occurs only when the surface-emitting laser array and the apertured plate are used in combination. Therefore, this factor was not much noticed in the past.

A configuration including a combination of an array of light emitting units which is a feature of VCSEL, and an apertured plate which is a basic element in optical systems, is applied to various fields that are targets of research in recent years and continuing.

Patent Document 1: Japanese Laid-Open Patent Publication No. 2005-252032
Patent Document 2: Japanese Laid-Open Patent Publication No. 2005-86027
Patent Document 3: Japanese Laid-Open Patent Publication No. 2007-103576

SUMMARY OF THE INVENTION

The present invention provides a light source unit, an optical scanning device, and an image forming apparatus, in which one or more of the above-described disadvantages are eliminated.

According to an aspect of the present invention, there is provided a light source unit including a surface-emitting laser array including light emitting units; and an apertured member provided on a light path of light beams emitted from the surface-emitting laser array, the apertured member including an aperture, wherein in at least one direction, an intensity distribution of interference patterns caused by the light beams passing through the aperture includes an equal number of crests and troughs.

According to an aspect of the present invention, there is provided a light source unit including a surface-emitting laser array including three or more light emitting units; and an apertured member provided on a light path of light beams emitted from the surface-emitting laser array, the apertured member including an aperture, wherein intervals between the three or more light emitting units are unequal in one direction, and an orthogonal projection of the aperture on a plane including a light emitting area of the surface-emitting laser array, has a length in the one direction that is a value between $\lambda L/d1 \times n$ and $\lambda L/d2 \times n$, where d1 is a first interval between the three or more light emitting units, d2 is a second interval between the three or more light emitting units, $\lambda$ is an oscillation wavelength of the surface-emitting laser array, L is a length of a vertical line extending from a center of the aperture to the plane, and n is an integer.

According to an aspect of the present invention, there is provided a light source unit including a surface-emitting laser array including three or more light emitting units; a collimated lens that causes light beams emitted from the surface-emitting laser array to become parallel light beams; and an apertured member provided on a light path of the light beams that have passed through the collimated lens, the apertured member including an aperture, wherein intervals between the three or more light emitting units are unequal in one direction, and an orthogonal projection of the aperture on a plane including a light emitting area of the surface-emitting laser array, has a length in the one direction that is a value between $\lambda L/d1 \times n$ and $\lambda L/d2 \times n$, where d1 is a first interval between the three or more light emitting units, d2 is a second interval between the three or more light emitting units, $\lambda$ is an oscillation wavelength of the surface-emitting laser array, L is a length of a vertical line extending from a center of the collimated lens to the plane, and n is an integer.

BRIEF DESCRIPTION OF THE DRAWINGS

Other objects, features and advantages of the present invention will become more apparent from the following detailed description when read in conjunction with the accompanying drawings, in which:

FIG. 4 is for describing an optical device included in the light source unit (part 1);

FIG. 5 is for describing the optical device included in the light source unit (part 2);

FIG. 6 is a cross-sectional view cut along A-A in FIG. 4;

FIG. 19 is for describing an apertured member including plural apertured plates;

DETAILED DESCRIPTION OF THE PREFERRED EMBODIMENTS

Figure 1:
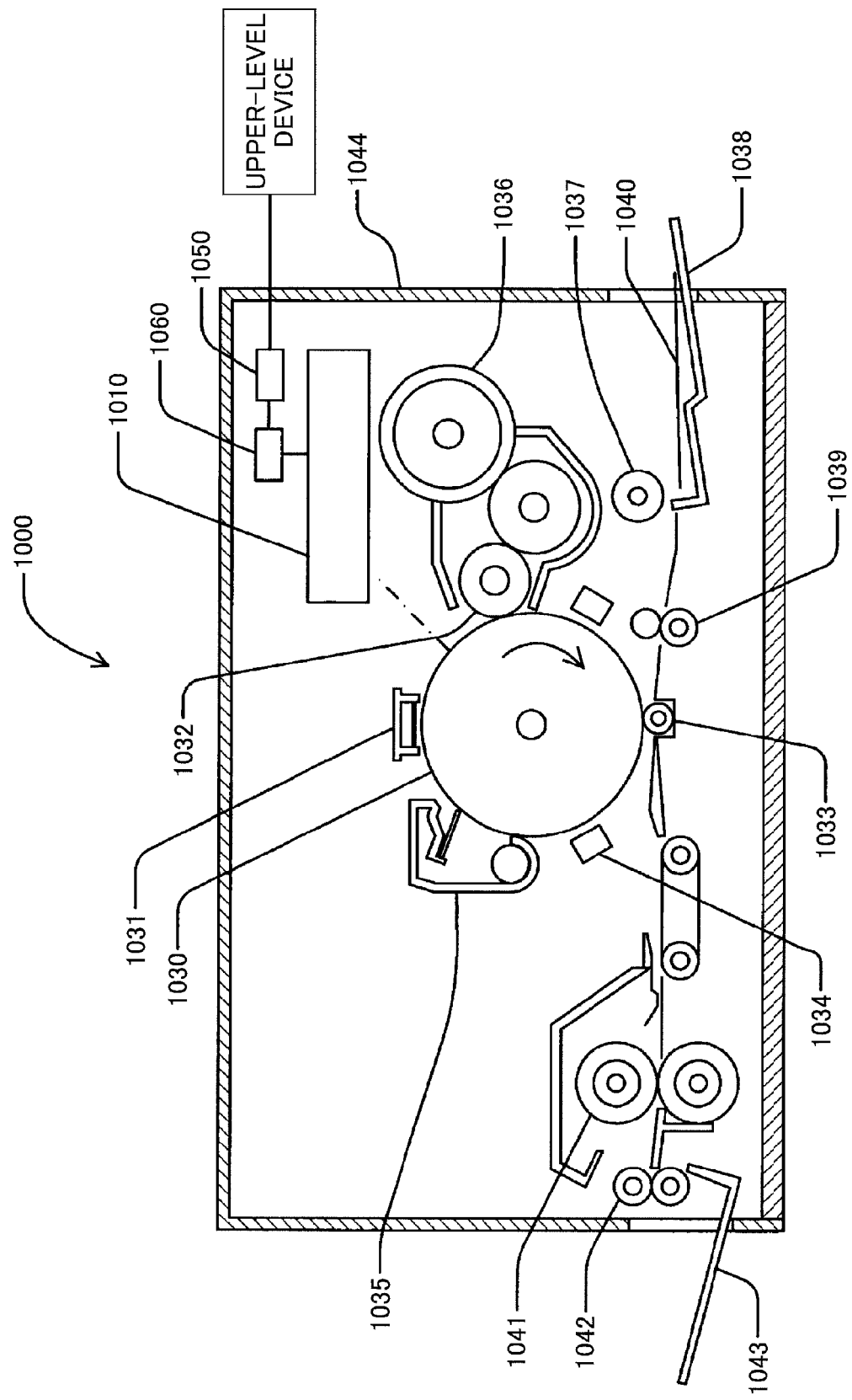
FIG. 1 is a schematic configuration diagram of a laser printer according to an embodiment of the present invention.

A description is given, with reference to the accompanying drawings, of embodiments of the present invention. FIG. 1 is a schematic configuration diagram of a laser printer 1000 as an image forming apparatus according to an embodiment of the present invention.

The laser printer 1000 includes an optical scanning device 1010, a photoconductive drum 1030, a charging unit 1031, a developing roller 1032, a transfer charger 1033, a neutralizing unit 1034, a cleaning unit 1035, a toner cartridge 1036, a sheet feed roller 1037, a sheet feed tray 1038, a pair of registration rollers 1039, a pair of fixing rollers 1041, a pair of discharge rollers 1042, a sheet discharge tray 1043, a communications control device 1050, and a printer control device 1060 that controls all of the above units. These units are accommodated at predetermined positions in a printer casing 1044.

The communications control device 1050 controls bidirectional communications between the laser printer 1000 and a higher-level device (for example, a personal computer) via a network.

The printer control device 1060 includes a CPU, a ROM storing programs described in codes that are readable by the CPU and various data items used when executing the programs, and a RAM that is a work memory. Furthermore, the printer control device 1060 controls the units in response to a request from an upper-level device, and sends image information received from an upper-level device to the optical scanning device 1010.

The photoconductive drum 1030 is a cylindrical member, having a photoconductive layer on its surface. The surface of the photoconductive drum 1030 serves as a scan target surface. The photoconductive drum 1030 rotates in a direction indicated by an arrow in FIG. 1.

The charging unit 1031, the developing roller 1032, the transfer charging unit 1033, the neutralizing unit 1034, and the cleaning unit 1035 are arranged around the photosensitive drum 1030 in this order, near the surface of the photoconductive drum 1030 and along a direction in which the photosensitive drum 1030 rotates.

The charging unit 1031 uniformly charges the surface of the photoconductive drum 1030.

The optical scanning device 1010 emits a light beam, which has been modulated based on image information received from the printer control device 1060, onto the surface of the photoconductive drum 1030 that is charged by the charging unit 1031. As a result, a latent image corresponding to the image information is formed on the surface of the photoconductive drum 1030. The latent image is then conveyed toward the developing roller 1032 with the rotation of the photoconductive drum 1030.

Toner accommodated in the toner cartridge 1036 is supplied to the developing roller 1032.

The developing roller 1032 causes the toner supplied from the toner cartridge 1036 to adhere to the latent image formed on the surface of the photoconductive drum 1030, so that the image information becomes visible. The latent image to which the toner has adhered (hereinafter referred to as a "toner image" as a matter of convenience) is conveyed toward the transfer charger 1033 with the rotation of the photoconductive drum 1030.

The sheet feed tray 1038 accommodates recording sheets 1040. The sheet feed roller 1037 arranged near the sheet feed tray 1038 picks up the sheets 1040 one by one from the sheet feed tray 1038, and feeds the sheet 1040 to the registration rollers 1039. The registration rollers 1039 temporarily hold the sheet 1040 picked up by the sheet feed roller 1037, and convey the sheet 1040 to a nip between the photoconductive drum 1030 and the transfer charger 1033 in synchronization with the rotation of the photoconductive drum 1030.

The transfer charger 1033 is charged with a voltage of a polarity opposite to that of the toner, so that the toner on the surface of the photoconductive drum 1030 is electrically attracted to the sheet 1040. According to this voltage, the toner image on the surface of the photoconductive drum 1030 is transferred onto the sheet 1040. The sheet 1040 on which the toner image is transferred is conveyed to the pair of fixing rollers 1041.

The toner image is fixed onto the sheet 1040 with heat and pressure applied by the fixing rollers 1041. The sheet 1040 is then conveyed to the discharge rollers 1042 to finally be discharged onto the sheet discharge tray 1043 and be successively stacked thereon.

The neutralizing unit 1034 neutralizes the surface of the photoconductive drum 1030.

The toner remaining on the surface of the photoconductive drum 1030 is removed by the cleaning unit 1035. Then, the position on the photoconductive drum 1030 from which the residual toner has been removed returns to a position facing the charging unit 1031.

Figure 2:
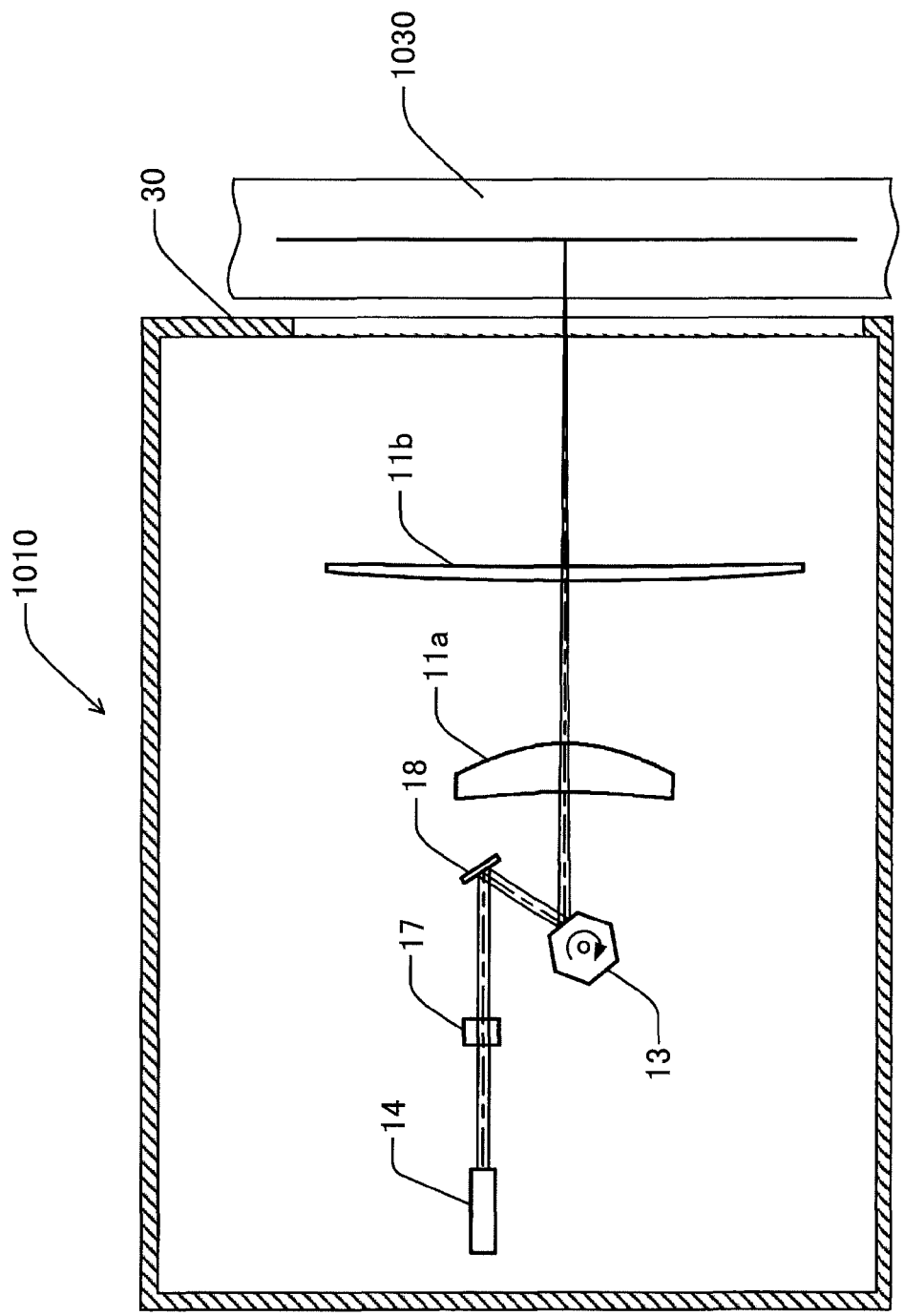
FIG. 2 is a schematic diagram of an optical scanning device shown in FIG. 1.

Next, a description is given of a configuration of the optical scanning device 1010. As shown in FIG. 2, the optical scanning device 1010 includes a light source unit 14, a cylindrical lens 17, a reflective mirror 18, a polygon mirror 13, a deflector side scanning lens 11a, an image side scanning lens 11b, and a scan control device (not shown). These elements are mounted at predetermined positions in an optical housing 30.

Figure 3:
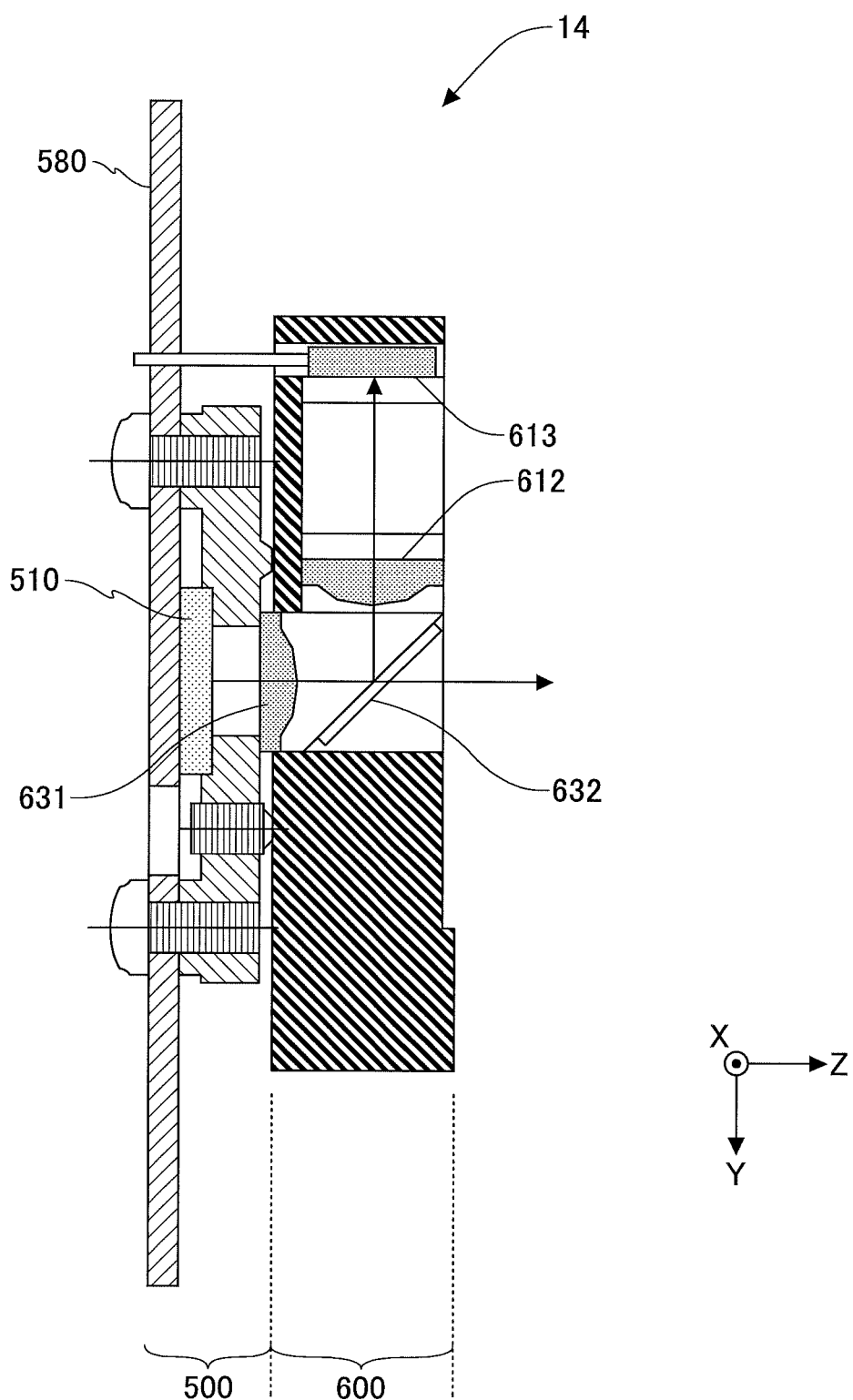
FIG. 3 is for describing a light source unit shown in FIG. 2.

As shown in the example of FIG. 3, the light source unit 14 includes a laser module 500 and an optical module 600.

In the present specification, the direction in which the light is emitted from the light source unit 14 is referred to as a Z axis direction, and the two directions orthogonal to each other in a plane vertical to the Z axis direction are referred to as an X axis direction and a Y axis direction. Furthermore, as a matter of convenience, the direction corresponding to a main scanning direction is referred to as a "main scanning correspondence direction", and the direction corresponding to a sub scanning direction is referred to as a "sub scanning correspondence direction".

The laser module 500 includes an optical device 510, a laser control device (not shown) for driving and controlling the optical device 510, and a PCB (Printed Circuit Board) 580 on which the optical device 510 and the laser control device are mounted.

As shown in an example of FIGS. 4 through 6, the optical device 510 includes a laser chip 100, a package member 200 for holding the laser chip 100, and a cover glass 300.

FIG. 4 is a plan view of the optical device 510, and FIG. 5 illustrates the optical device 510 without the cover glass 300. FIG. 6 is a cross-sectional view cut along A-A in FIG. 4. As a matter of simplification, in FIGS. 5 and 6, bonding wires connecting the laser chip 100 and the package member 200 are not shown.

The laser chip 100 includes plural light emitting units. Each light emitting unit is a Vertical Cavity Surface Emitting Laser (VCSEL) having an oscillation wavelength of a 780 nm band. The laser chip 100 is a surface emitting laser array chip.

The package member 200 is a flat package referred to as a CLCC (ceramic leaded chip carrier). On the +Z side of the package member 200, there is a space area surrounded by walls.

Figure 7:
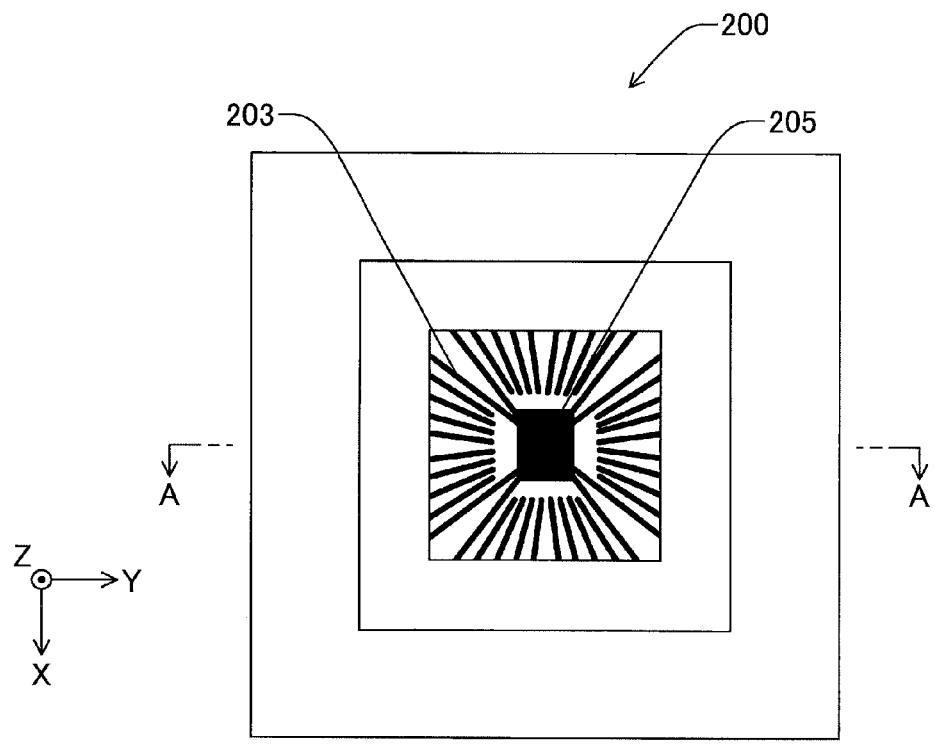
FIG. 7 is a plan view of a package member.
Figure 8:
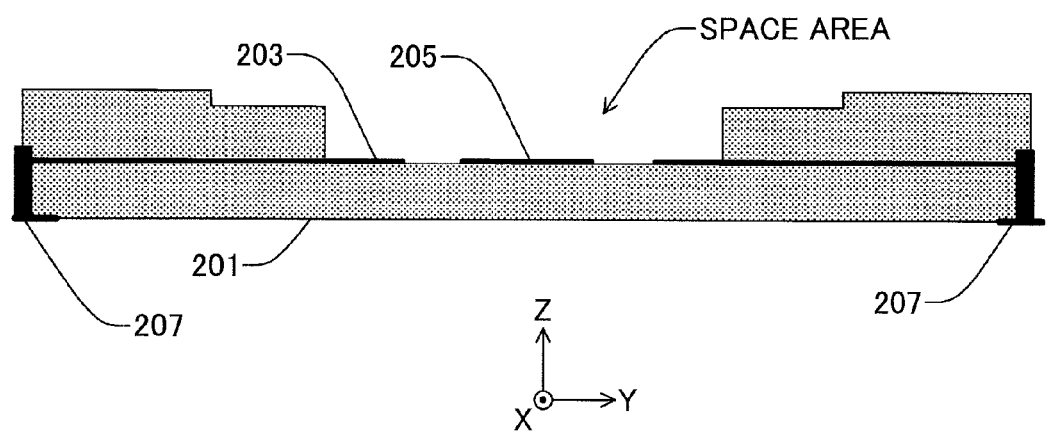
FIG. 8 which is a cross-sectional view cut along A-A in FIG. 7.

As shown in FIG. 7 and FIG. 8 which is a cross-sectional view cut along A-A in FIG. 7, the package member 200 is a multilayer structure including ceramic 201 and metal wirings 203.

The metal wirings 203 extend from the periphery of the package member 200 toward the center of the package member 200. Each of the metal wirings 203 is connected to one of plural metal casters 207 at the side surfaces of the package member 200.

A metal film 205 is provided at the center of the bottom surface of the space area. The metal film 205 is also referred to as a die attach area, which is a common electrode. The eight metal wirings positioned in the four corners are connected to the metal film 205.

The walls of the space area are, for example, a structure having one stage.

The laser chip 100 is positioned at substantially the center of the bottom surface of the space area, and is die-bonded onto the metal film 205 with a soldering material such as AuSn. That is to say, the laser chip 100 is held on the bottom surface of the space area surrounded by walls.

On the stage part of the walls of the space area, the cover glass 300 is bonded with an epoxy resin adhesive so as to seal the space area (see FIG. 6). Accordingly, the laser chip 100 is protected. The surface of the cover glass 300 is parallel to the XY plane.

Referring back to FIG. 3, the optical module 600 includes a collimated lens 631, an apertured plate 632, a condensing lens 612, and a light receiving element 613.

The optical module 600 is positioned such that the collimated lens 631 is positioned on the +Z side of the optical device 510, and on a light path of light beams emitted from the laser chip 100.

The collimated lens 631 makes the light beams emitted from the laser chip 100 become substantially parallel light beams.

The apertured plate 632 has an aperture, and adjusts the light beams that have passed through the collimated lens 631. Light beams that have passed through the aperture of the apertured plate 632 become light beams that are emitted by the light source unit 14. Adjusting the light beams means to "adjust the light beams to have shapes appropriate for forming a latent image on a photoconductive drum with high precision".

The surface of the periphery of the aperture of the apertured plate 632 is coated by aluminum or silver, so that a high reflection ratio is attained.

The apertured plate 632 is positioned in a tilted manner with respect to a plane vertical to the light axis direction of the collimated lens 631, because the light beams reflected from the periphery of the aperture of the apertured plate 632 are used as monitoring light beams. In this example, the apertured plate 632 is positioned such that the light beams that have entered the periphery of the aperture are reflected in a −Y direction.

The condensing lens 612 is positioned on the −Y side of the apertured plate 632, and condenses the monitoring light beams that have been reflected from the apertured plate 632.

The light receiving element 613 is positioned on the −Y side of the condensing lens 612, and receives the monitoring light beans that have passed through the condensing lens 612. The light receiving element 613 outputs signals according to the amount of received light (photoelectric conversion signals) to the laser control device.

Referring back to FIG. 2, the cylindrical lens 17 condenses the light emitted from the light source unit 14 near the deflection reflection surface of the polygon mirror 13 via the reflective mirror 18.

The optical system positioned on the light path between the laser chip 100 and the polygon mirror 13 is referred to as a pre-deflector optical system. In the present embodiment, the pre-deflector optical system includes the collimated lens 631, the apertured plate 632, the cylindrical lens 17, and the reflective mirror 18.

The polygon mirror 13 is made of a regular hexagonal cylinder member having a low height, with six deflection reflection surfaces formed on the sides. A rotating mechanism (not shown) is used to rotate the polygon mirror 13 at a fixed angular speed in a direction indicated by an arrow in FIG. 2. Accordingly, the light that has been emitted from the light source unit 14 and condensed near the deflection reflection surface of the polygon mirror 13 by the cylindrical lens 17 is deflected by a fixed angular speed by the rotation of the polygon mirror 13.

The deflector side scanning lens 11a is positioned on a light path of a light deflected by the polygon mirror 13.

The image side scanning lens 11b is positioned on a light path of light that has passed through the deflector side scanning lens 11a. The light that has passed through the image side scanning lens 11b is radiated onto the surface of the photoconductive drum 1030, so that a light spot is formed. The light spot moves in the longitudinal direction of the photoconductive drum 1030 as the polygon mirror 13 rotates. That is to say, the light spot scans the photoconductive drum 1030. The direction in which the light spot moves is the "main scanning direction". The direction in which the photoconductive drum 1030 rotates is the "sub scanning direction".

The optical system provided along a light path extending between the polygon mirror 13 and the photoconductive drum 1030 is referred to as a scanning optical system. In the present embodiment, the scanning optical system includes the deflector side scanning lens 11a and the image side scanning lens 11b. At least one turn-around mirror may be provided on at least one of the light path extending between the deflector side scanning lens 11a and the image side scanning lens 11b and the light path extending between the image side scanning lens 11b and the photoconductive drum 1030.

The inventors of the present invention observed the beam patterns of the surface-emitting laser array with the use of a high-speed camera. Accordingly, it was confirmed that interference patterns are instantaneously formed when noise is generated due to returning light that has been emitted from another light emitting unit. As a result of performing detailed verification, it was found that interference patterns are not frequently formed, but are formed only rarely. It was found that variations in the amount of light beams passing through the aperture are caused by the interference patterns. As interference patterns are formed, the spatial light becomes strong and/or weak. Furthermore, a part of the spatial light is cut out by the aperture, and therefore the amount of light beams passing through the aperture differs when there is no interference and when there is interference. Assuming that there is no aperture, even if interference occurs, the entire amount of light does not change, and therefore the amount of light does not vary. The interference patterns largely affect image quality if the amount of light used for writing images vary, and therefore inconsistent densities become conspicuous. That is to say, interference patterns largely affect the image quality, and even if interference patterns rarely appear, it is necessary to reduce interference patterns.

Generally, an interval $x_0$ between interference patterns according to two light sources is expressed by the following formula (1), as known in Young's interference experiment. In formula (1), d is the interval between two light emitting units, λ is the oscillation wavelength, and L is the length between the light source and the observed plane.

$$x_0 = L \cdot \lambda / d \tag{1}$$

The intensity of an interference pattern is periodically distributed by an intensity distribution of a sine wave. The amount of light is determined based on whether there are more crests (points where the light beams strengthen each other) or whether there are more troughs (points where the light beams weaken each other), in the light beams cut out by the aperture. When the numbers of crests and troughs are equal, it means that the amount of light does not vary. Therefore, in order to fix the amount of light beams passing through the aperture, the width of an orthogonal projection of the aperture on a plane including the light emission surface of the surface-emitting laser array (the width being in a vertical direction to the interference patterns) is to be an integral multiple of the interval $x_0$ between the interference patterns. As a matter of convenience, the orthogonal projection of the aperture on a plane including the light emission surface of the surface-emitting laser array is referred to as the "aperture projection". Furthermore, the plane including the light emission surface of the surface-emitting laser array is referred to as the "projection plane".

Specifically, a description is given of the size of the aperture.

Example 1

Figure 9:
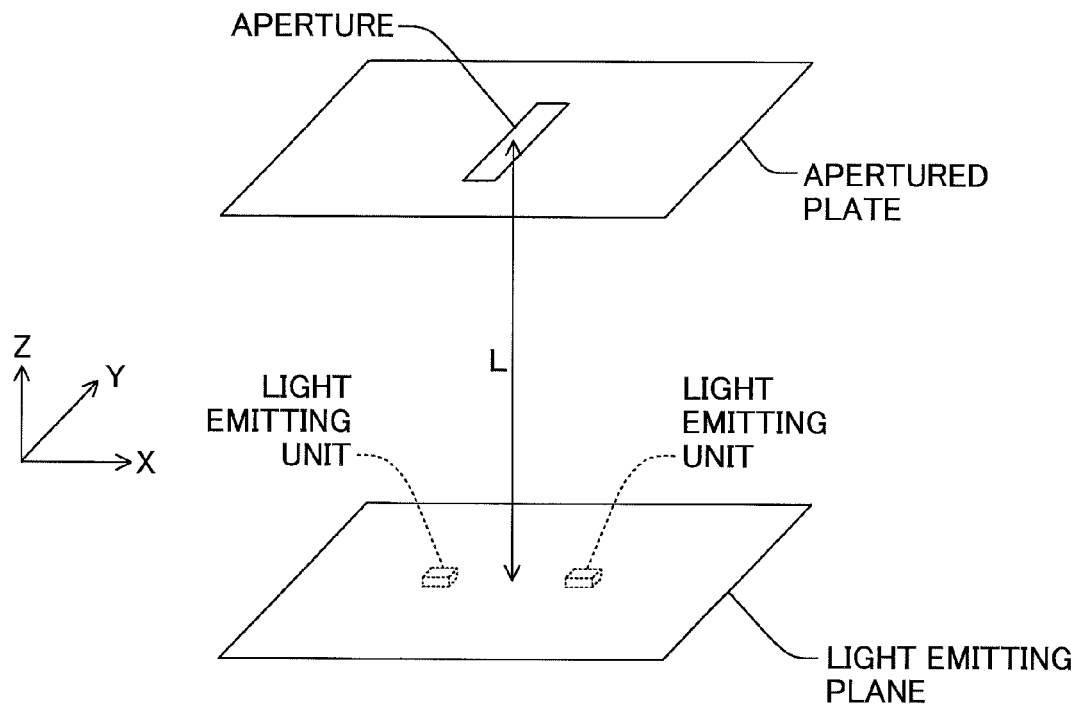
FIG. 9 is for describing example 1 (part 1)
Figure 10:
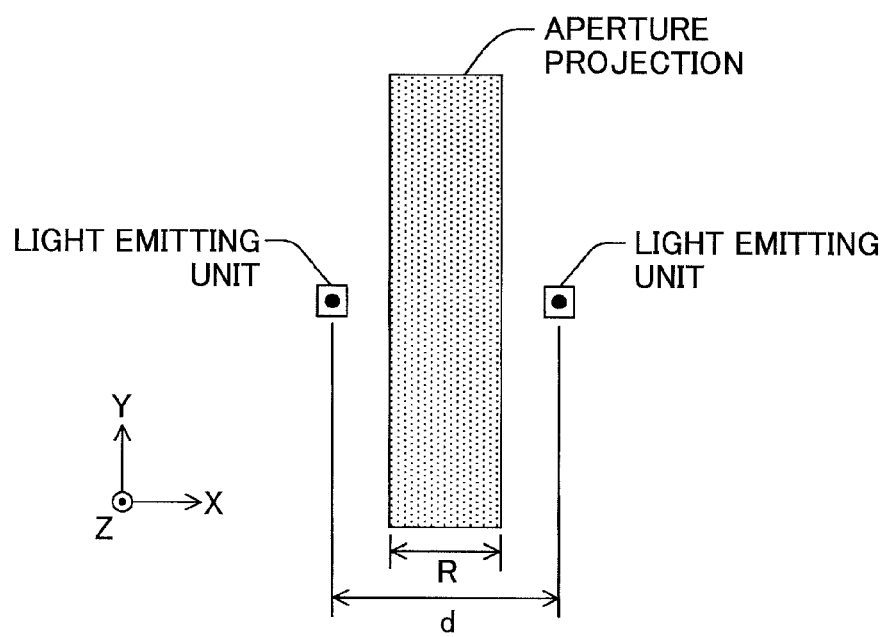
FIG. 10 is for describing example 1 (part 2)

The apertured plate is parallel to an XY plane, and the aperture projection of an aperture in the apertured plate has a rectangular shape having a short side that is parallel to the X axis direction. Plural light emitting units are evenly spaced apart in a row with an interval d in the X axis direction (see FIGS. 9 and 10). In the present specification, the interval between light emitting units means a center-to-center distance between two light emitting units.

In this case, the L in the above formula (1) is the length of a vertical line extending from the center of the aperture to the light emitting plane.

Assuming that d=80 μm, L=100 mm, and λ=780 nm, then L·λ/d is 0.975 mm. By forming the aperture such that the length R of the short side of the aperture projection is 1.95 mm which is two times L·λ/d, the amount of light beams passing through the aperture can be fixed.

Example 2

Figure 11:
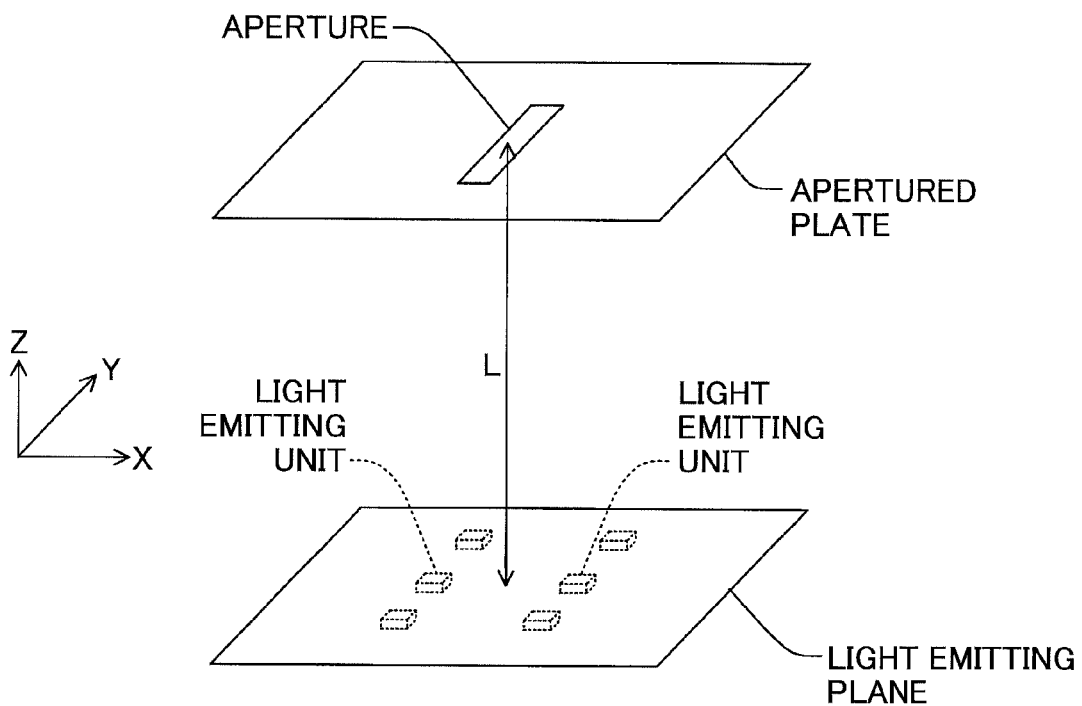
FIG. 11 is for describing example 2 (part 1)
Figure 12:
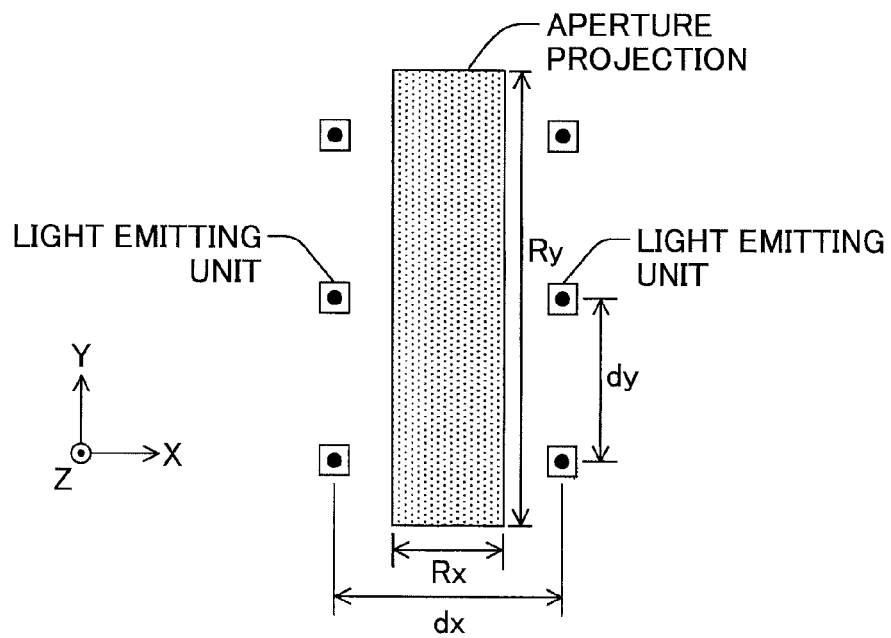
FIG. 12 is for describing example 2 (part 2)

The apertured plate is parallel to an XY plane, and the aperture projection of an aperture in the apertured plate has a rectangular shape having a short side that is parallel to the X axis direction. Plural light emitting units are arranged in a matrix along the X axis direction and in the Y axis direction (see FIGS. 11 and 12). In FIG. 12, dx is the interval between light emitting units in the X axis direction, and dy is the interval between light emitting units in the Y axis direction. Furthermore, Rx is the length of the short side of the aperture projection, and Ry is the length of the long side of the aperture projection. In this example, the shape of the aperture and the shape of the aperture projection are the same.

Assuming that dx=80 μm, dy=40 μm, L=100 mm, and λ=780 nm, then L·λ/dx is 0.975 mm and L·λ/dy is 1.95 mm. By forming the aperture such that Rx is 1.95 mm which is two times L·λ/dx and Ry is 3.90 mm which is two times L·λ/dy, the amount of light beams passing through the aperture can be fixed.

Figure 13A:
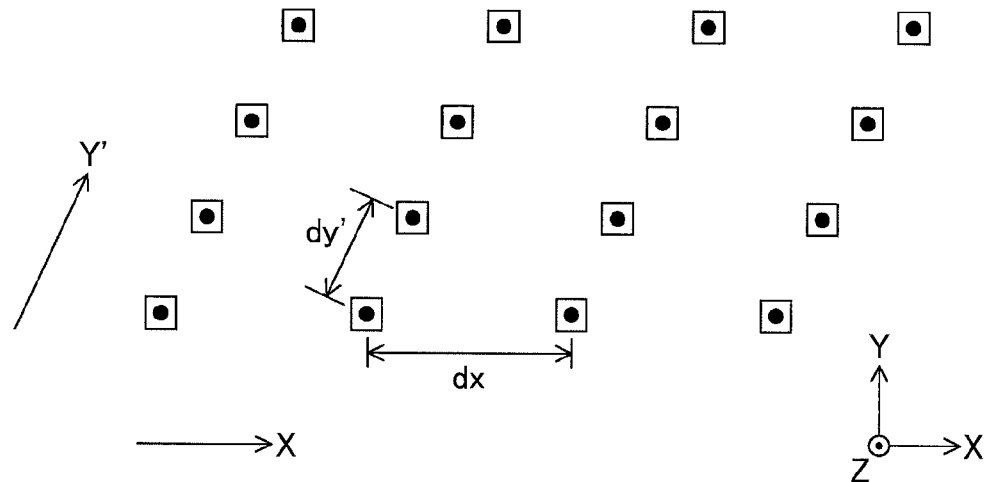
FIGS. 13A and 13B are for describing modifications of plural light emitting units arranged two-dimensionally.

In the example illustrated in FIG. 13A, plural light emitting units are arranged two-dimensionally. In this example, the directions of the two rows are not orthogonal to one another (the X axis direction and the Y' axis direction in FIG. 13A). However, by forming the aperture such that each length of the aperture projection corresponding to one of the directions in which the plural light emitting units are arranged becomes substantially the integral multiple of the interval between interference patterns in the corresponding direction, the amount of light beams passing through the aperture can be fixed. In the example of FIG. 13A, the aperture is formed such that the length of the aperture projection in the Y axis direction is substantially the integral multiple of (Lλ/dy')/sin α, assuming that the angle between the X axis and the Y' axis is α.

Figure 13B:
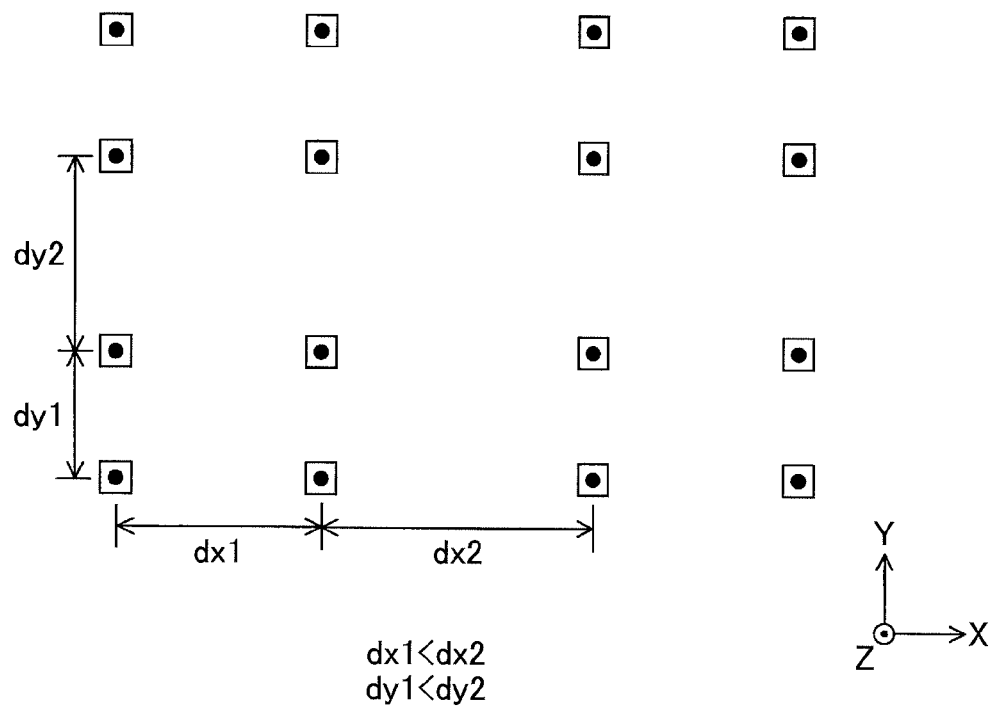

In the example illustrate in FIG. 13B, the light emitting units are not evenly spaced apart in both directions (X axis direction and Y axis direction). The aperture is formed such that the length of the aperture projection in the X axis direction is a value between λL/dx1×nx and λL/dx2×nx, assuming that the intervals between the light emitting units in the X axis direction are dx1 and dx2, and nx is an integer. Furthermore, the aperture is formed such that the length of the aperture projection in the Y axis direction is a value between λL/dy1×ny and λL/dy2×ny, assuming that the intervals between the light emitting units in the Y axis direction are dy1 and dy2, and ny is an integer. Accordingly, the amount of light beams passing through the aperture can be fixed.

Example 3

Figure 14:
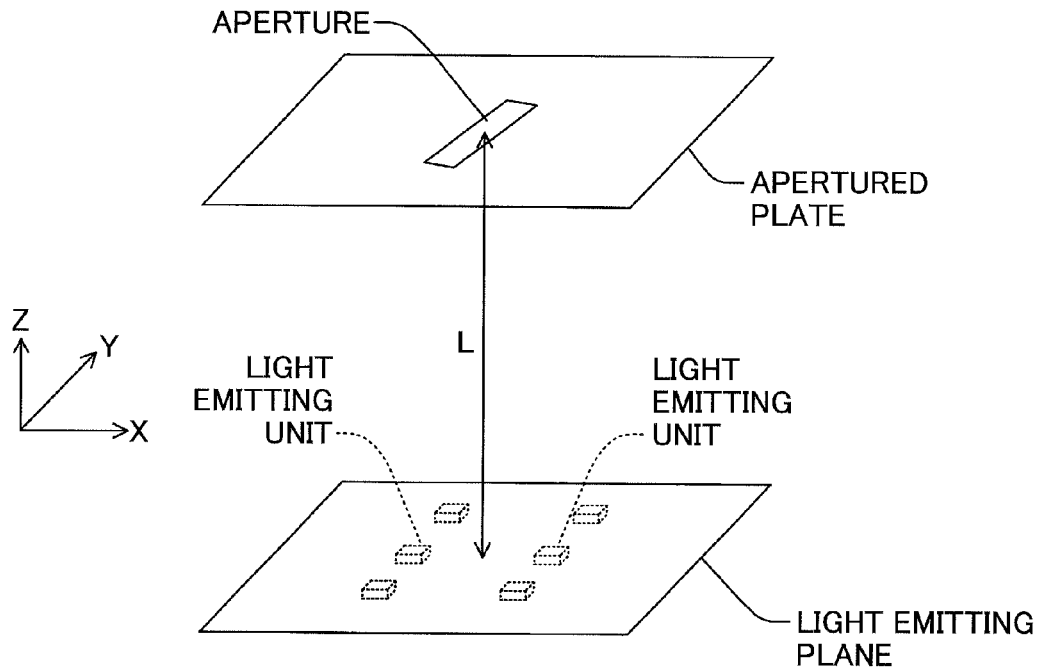
FIG. 14 is for describing example 3 (part 1)
Figure 15:
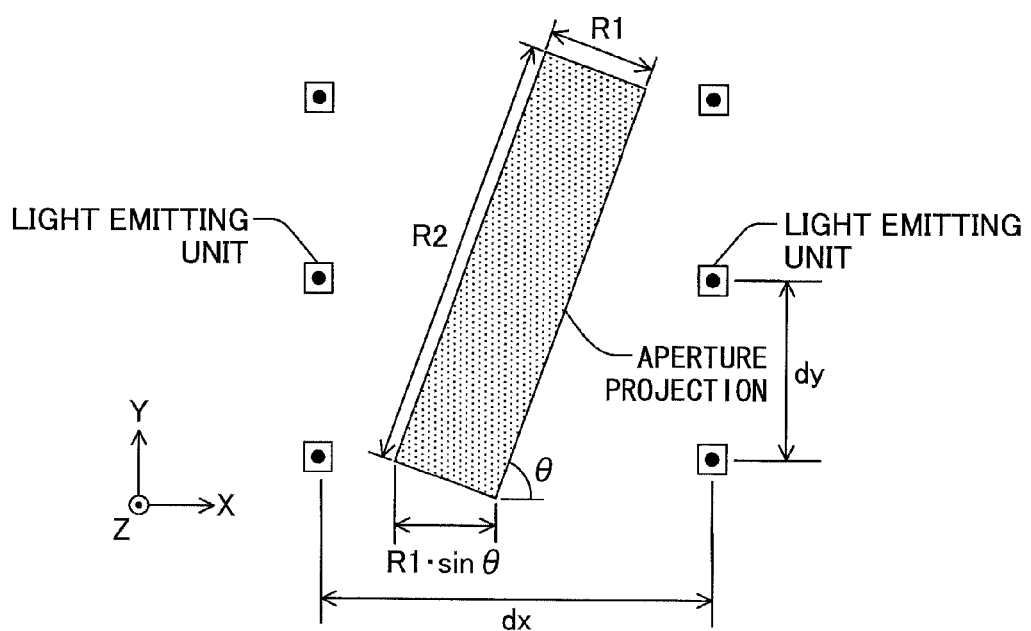
FIG. 15 is for describing example 3 (part 2)

The apertured plate is parallel to an XY plane, and the aperture projection of an aperture in the apertured plate has a rectangular shape having a long side that is tilted (tilt angle θ) with respect to the X axis direction. Plural light emitting units are arranged in a matrix along the X axis direction and in the Y axis direction (see FIGS. 14 and 15). In FIG. 15, R1 is the length of the short side of the aperture projection, and R2 is the length of the long side of the aperture projection.

Assuming that dx=80 μm, L=100 mm, and λ=780 nm, then L·λ/dx is 0.975 mm. By forming the aperture such that R1·sin θ is 1.95 mm (R1=2.25 mm) which is two times L·λ/dx, the amount of light beams passing through the aperture can be fixed.

The aperture may be formed such that R2·cos θ is an integral multiple of L·λ/dx.

In reality, it is difficult to form the aperture such that the size of the aperture projection completely satisfies the above conditions; slight errors may arise in the size, which lead to degrading the effect of mitigating variations in the amount of light. Furthermore, factors other than errors in the size may degrade the effect of mitigating variations in the amount of light, such as burrs remaining in the four corners of the aperture, or the four corners becoming round.

To address these problems, when selecting either one of R1·sin θ or R2·cos θ as the length to be made an integral multiple of the interval between interference patterns in the X axis direction, the one having interference patterns with less crests and troughs is to be selected. This is because with interference patterns having less crests and troughs passing through the aperture, the degree of variability with respect to the amount of light is greater. The length having interference patterns with less crests and troughs is the length corresponding to the direction of light sources arranged with narrower intervals. Accordingly, the length of the aperture relevant to interference patterns with less crests and troughs is preferably the length to be adjusted.

Furthermore, the aperture may be formed such that both R1·sin θ and R2·cos θ are integral multiples of L·λ/dx.

Furthermore, the aperture may be formed such that at least one of R1·cos θ and R2·sin θ is an integral multiple of L·λ/dx.

Example 4

Figure 16:
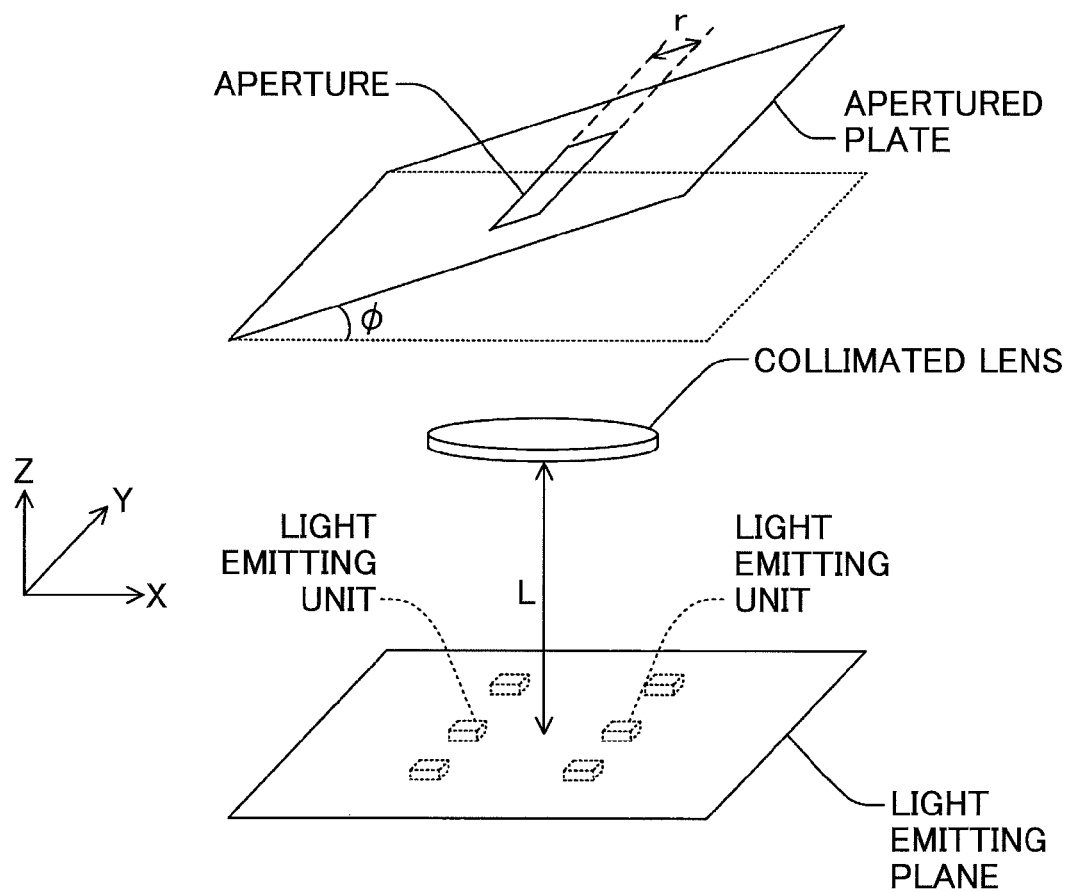
FIG. 16 is for describing example 4 (part 1)
Figure 17:
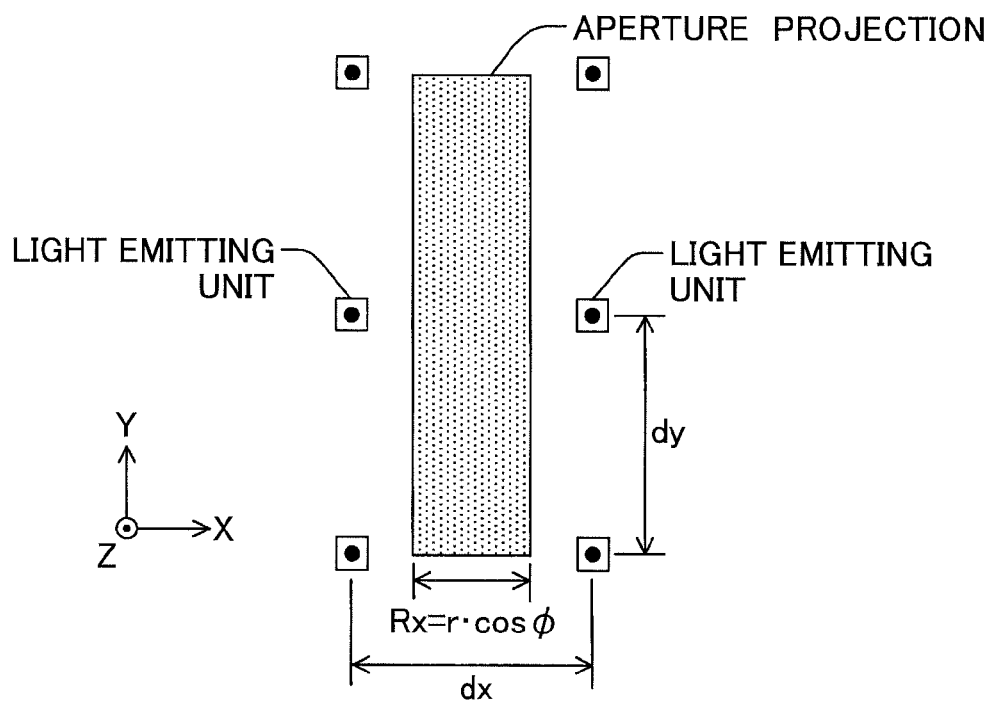
FIG. 17 is for describing example 4 (part 2)

A collimated lens is provided on an optical path between the apertured plate and a laser chip. The apertured plate is tilted (tilt angle φ) with respect to the XY plane, and the aperture projection has a rectangular shape having a short side parallel to the X axis direction. Plural light emitting units are arranged in a matrix along the X axis direction and in the Y axis direction (see FIGS. 16 and 17).

In this example, after passing through the collimated lens, the light beams become parallel light, and therefore there are no differences in the optical paths, and the intervals between interference patterns do not change. In this example, in the formula (1) described above, L is the length of a vertical line extending from the center of the collimated lens to the light emitting plane. Assuming that the length of the short side of the aperture is r, the length Rx of the short side of the aperture projection is r·cos φ.

Assuming that dx=80 μm, L=100 mm, and λ=780 nm, then L·λ/dx is 0.975 mm. By forming the aperture such that the length of the short side of the aperture projection Rx(=r·cos φ) is 1.95 mm which is two times L·λ/dx, the amount of light beams passing through the aperture can be fixed. For example, if φ=45°, then r=2.75 mm.

In this case, as described in the example 3 above, when the long side of the aperture projection is tilted (tilt angle θ) with respect to the X axis direction, by forming the aperture such that r·sin θ·cos φ is an integral multiple of L·λ/dx, the amount of light beams passing through the aperture can be fixed.

Furthermore, the aperture may be formed such that the length of the long side of the aperture projection is an integral multiple of L·λ/dy.

Figure 18A:
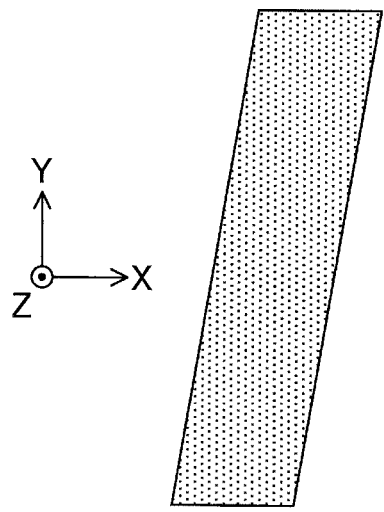
FIGS. 18A through 18C are for describing modifications of shapes of aperture projections.
Figure 18B:
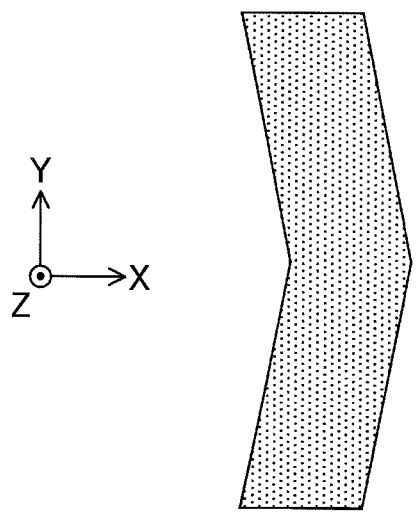
Figure 18C:
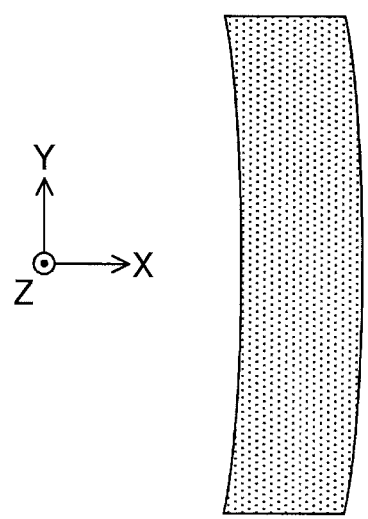

In the above examples, the aperture projection has a rectangular shape, although the present invention is not so limited. For example, the aperture projection may be a parallelogram as shown in FIG. 18A. For example, the aperture projection may be a concave polygon as shown in FIG. 18B. For example, the aperture projection may be a curved shape as shown in FIG. 18C. In any case, by forming the aperture such that the length of the aperture projection in the X axis direction is an integral multiple of the interval between interference patterns in the X axis direction, the amount of light beams passing through the aperture can be fixed. That is to say, the aperture may be any shape other than a rectangle. In the above examples, the direction that is a factor of light variation is the X axis direction.

Furthermore, instead of using the apertured plate as described above, an apertured member including plural apertured plates may be used (see FIG. 19). In this case, the four corners of the aperture can be accurately formed to have desired shapes. That is to say, the aperture can be made to have a desired shape more precisely than the case of using only one apertured plate.

Example 5

Figure 20:
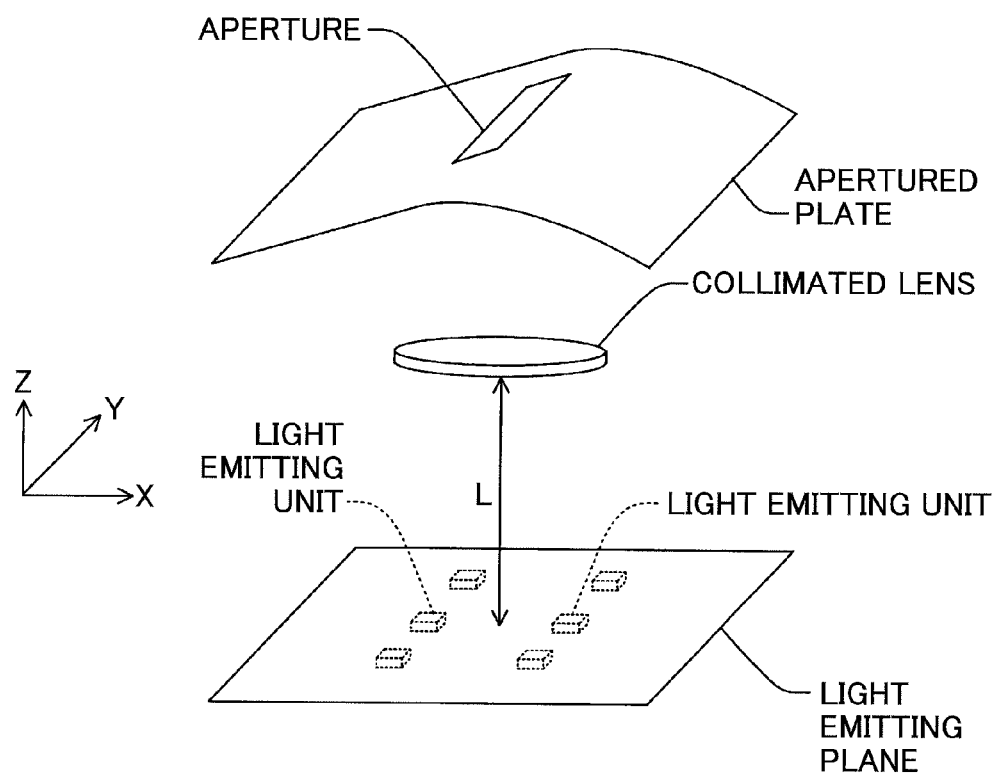
FIG. 20 is for describing example 5.

A collimated lens is provided on an optical path between the apertured plate and a laser chip. The apertured plate is not a flat plate, and the aperture projection has a rectangular shape having a short side parallel to the X axis direction. Plural light emitting units are arranged in a matrix along the X axis direction and in the Y axis direction (see FIG. 20).

In this example, in the formula (1) described above, L is the length of a vertical line extending from the center of the collimated lens to the light emitting plane.

Assuming that dx=80 μm, L=100 mm, and λ=780 nm, then L·λ/dx is 0.975 mm. By forming the aperture such that the length of the short side of the aperture projection R is 1.95 mm which is two times L·λ/dx, the amount of light beams passing through the aperture can be fixed. That is to say, the apertured plate is not limited to a flat plate.

Figure 21:
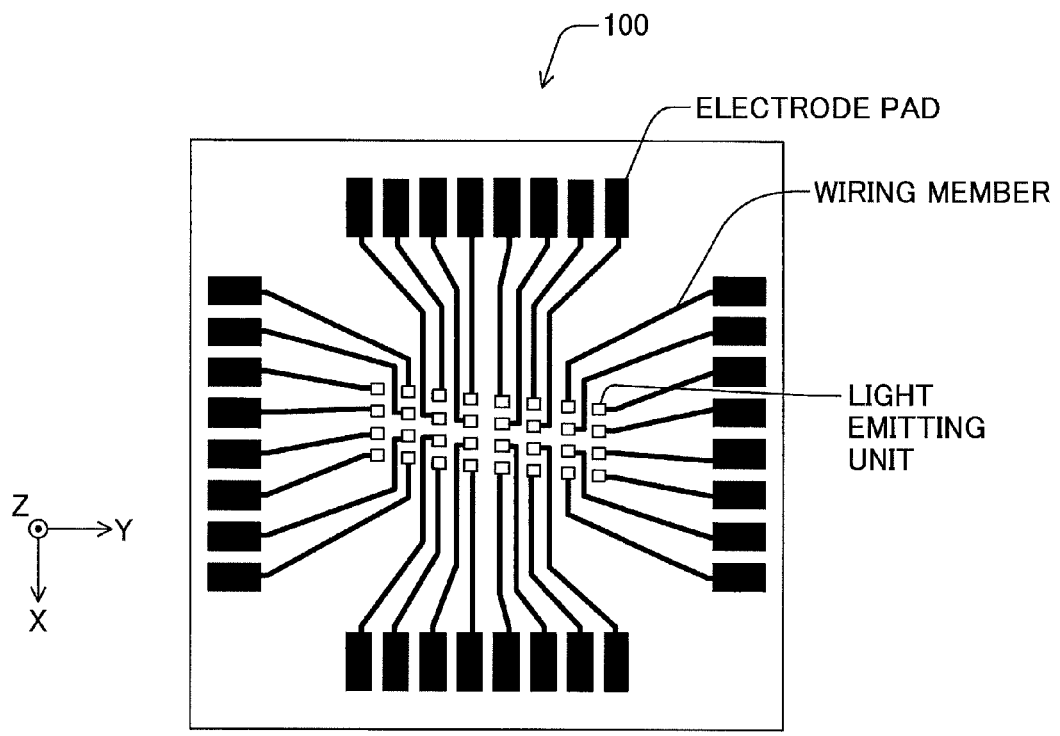
FIG. 21 is for describing a laser chip.

As shown in an example of FIG. 21, the laser chip 100 according to the present embodiment includes 32 light emitting units arranged two-dimensionally, and 32 electrode pads corresponding to the light emitting units being arranged around the 32 light emitting units. Each electrode pad is electrically coupled to the corresponding light emitting unit with a wiring member.

Figure 22:
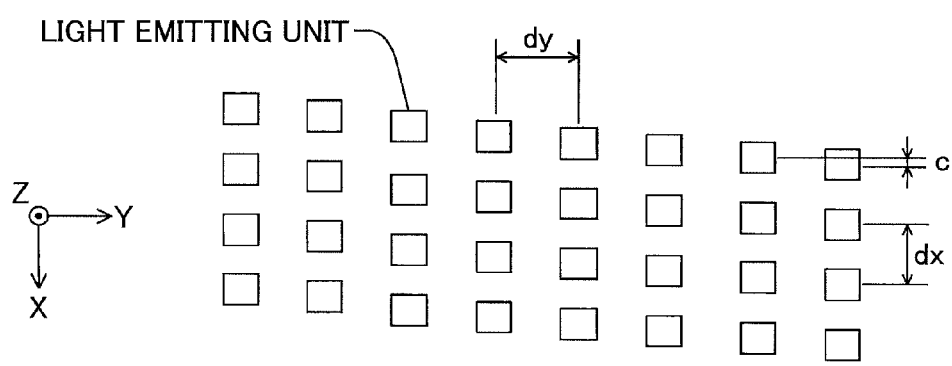
FIG. 22 is for describing an arrangement of plural light emitting units in a laser chip.

As shown in FIG. 22, the 32 light emitting units are evenly spaced apart (with intervals "c" in FIG. 22) when all light emitting units are orthographically-projected on a virtual line extending in the Z axis direction. The intervals dx between the light emitting units in the X axis direction is 80 μm.

In the present example, similar to example 4 above, L=100 mm, λ=780 nm, φ=45°, and the length r of the short side of the aperture is 2.75 mm.

In the present example, the amount of light beams emitted from the light source unit 14 is stable with little variation.

Figure 23:
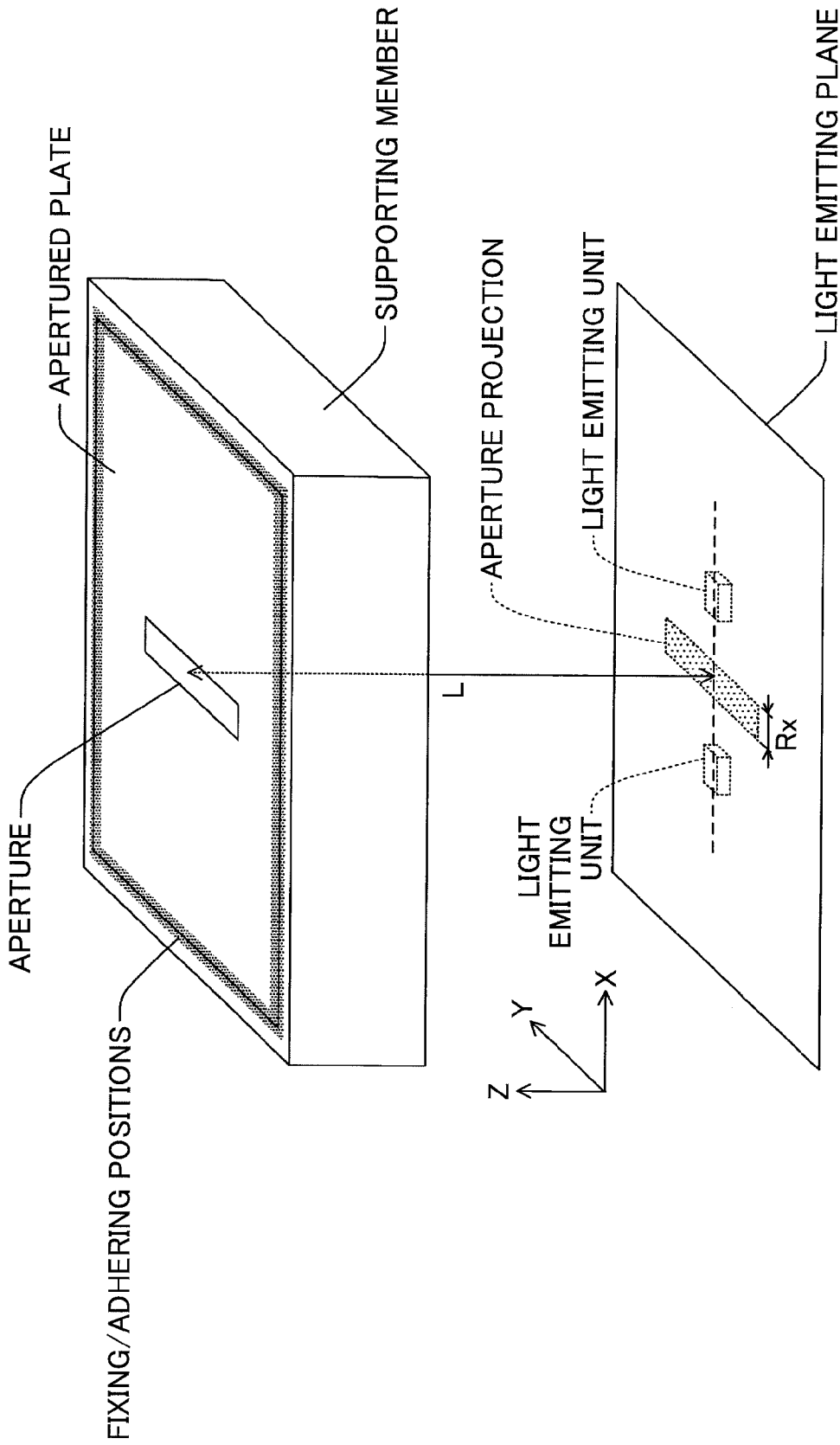
FIG. 23 is for describing a conventional fixing method of fixing the apertured plate to a supporting member.

Typically, when fixing an apertured plate, as shown in FIG. 23, the four sides of the apertured plate are attached to a supporting member with screws or an adhesive. However, during the fixing process, there may be cases where foreign matter enters in between the supporting member and the apertured plate, or the adhesive flows in between the supporting member and the apertured plate.

Figure 24A:
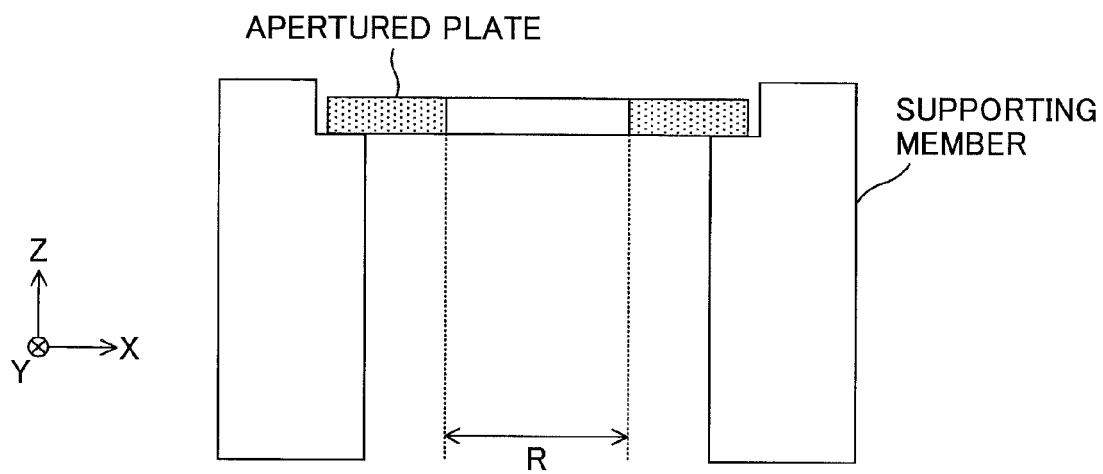
FIGS. 24A and 24B are for describing inconveniences in the conventional fixing method.
Figure 24B:
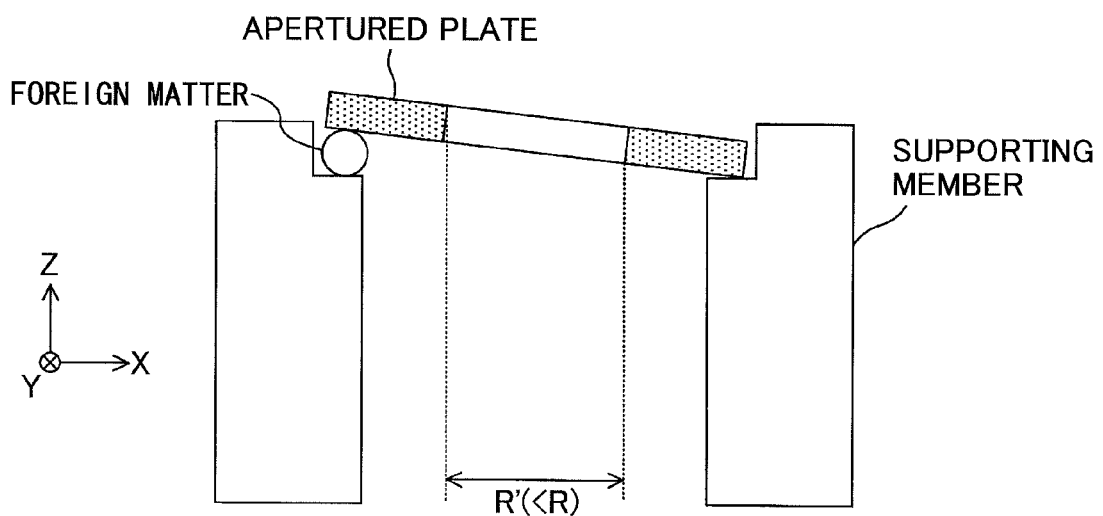

As shown in an example of FIG. 24A, the length R of the aperture of the apertured plate is designed on the assumption that the apertured plate is arranged in parallel to the light emitting plane. The length R becomes an integral multiple of the interval between interference patterns. As shown in an example of FIG. 24B, when foreign matter enters in between the supporting member and the apertured plate, and the apertured plate is no longer parallel with respect to the light emitting plane, a length R' of the aperture projection becomes shorter than the length R. In this case, the amount of light passing though the aperture may become unstable.

When plural light emitting units are arranged one-dimensionally, in order to prevent variations in the amount of light passing through the aperture, the length of the aperture projection on the light emitting plane in the direction in which the light emitting units are arranged needs to be precisely an integral multiple of the interval between interference patterns. Meanwhile, there is no restriction with respect to the length of the aperture projection on the light emitting plane in the direction orthogonal to the direction in which the light emitting units are arranged.

Therefore, in order to prevent the length of the aperture projection in a light emitting plane from deviating from the intended length due to foreign matter, the apertured plate is preferably fixed to the supporting member at positions parallel to the direction in which the light emitting units are arranged. Accordingly, the amount of light beams passing through the aperture can be fixed.

Fixing Example 1

Figure 25:
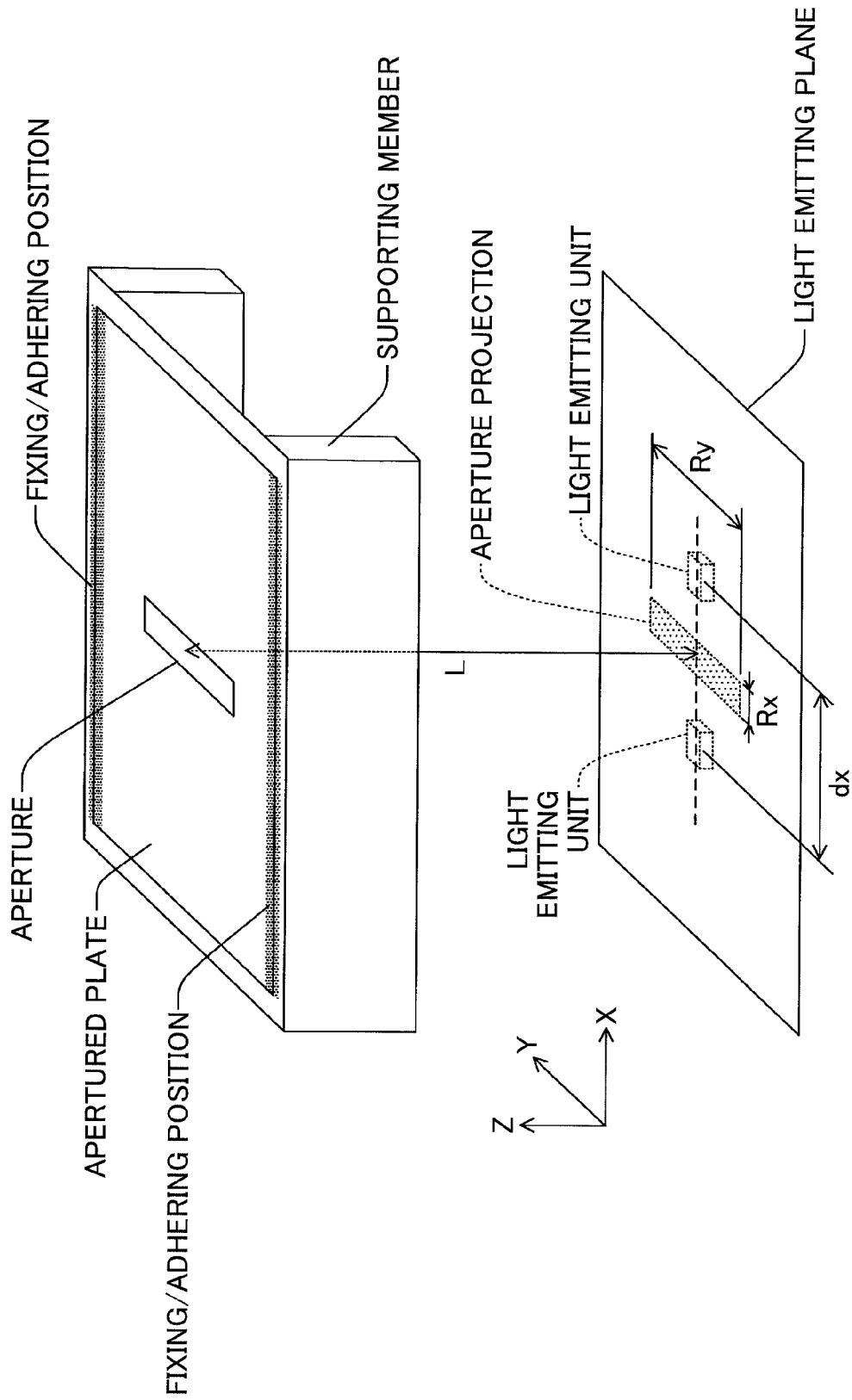
FIG. 25 is for describing a fixing example 1 according to an embodiment of the present invention.

FIG. 25 illustrates a fixing example 1 of fixing the apertured plate to the supporting member. In this example, plural light emitting units are arranged one-dimensionally along the X axis direction. The interval between light emitting units is dx, the length of the aperture projection in the X axis direction on the light emitting plane is Rx, the length of the aperture projection in the Y axis direction on the light emitting plane is Ry, and the length of a vertical line extending from the center of the aperture to a light emitting plane is L.

The apertured plate and the aperture have a rectangular shape, and the four sides of the aperture are respectively parallel to the four sides of the apertured plate. Furthermore, the length Rx is an integral multiple of the intervals between interference patterns (xO). Accordingly, the apertured plate has been designed such that the amount of light beams passing through the aperture is fixed regardless of the occurrence of interference patterns. It is assumed that the apertured plate is provided in parallel to the light emitting plane.

The specific sizes are λ=780 nm, d=80 μm, and L=100 mm. The interval xO between interference patterns is 0.975 mm under these conditions. Rx is 1.95 mm, which is two times the interval xO between interference patterns.

When fixing the apertured plate to the supporting member, the +Y side and the −Y side of the apertured plate are fixed to the supporting member with an adhesive. Instead of using an adhesive, screws may be used to fix the apertured plate.

In this example, it is possible to prevent foreign matter from entering in between the support member and the apertured plate or prevent the adhesive from flowing in between the supporting member and the apertured plate, and the length of Rx can be prevented form changing. Only Rx contributes to the variation in the amount of light passing through the aperture in relation to the occurrence of interference patterns, and Ry does not contribute to the variation in the amount of light. Consequently, the amount of light beams passing through the aperture can be fixed regardless of the occurrence of interference patterns. It has been confirmed that with this example, the variation in the amount of light is reduced compared to the case of a conventional configuration.

That is to say, in the fixing example 1, the parts of the apertured plate in parallel with the X axis direction are fixed to the supporting member by an adhesive.

Fixing Example 2

Figure 26:
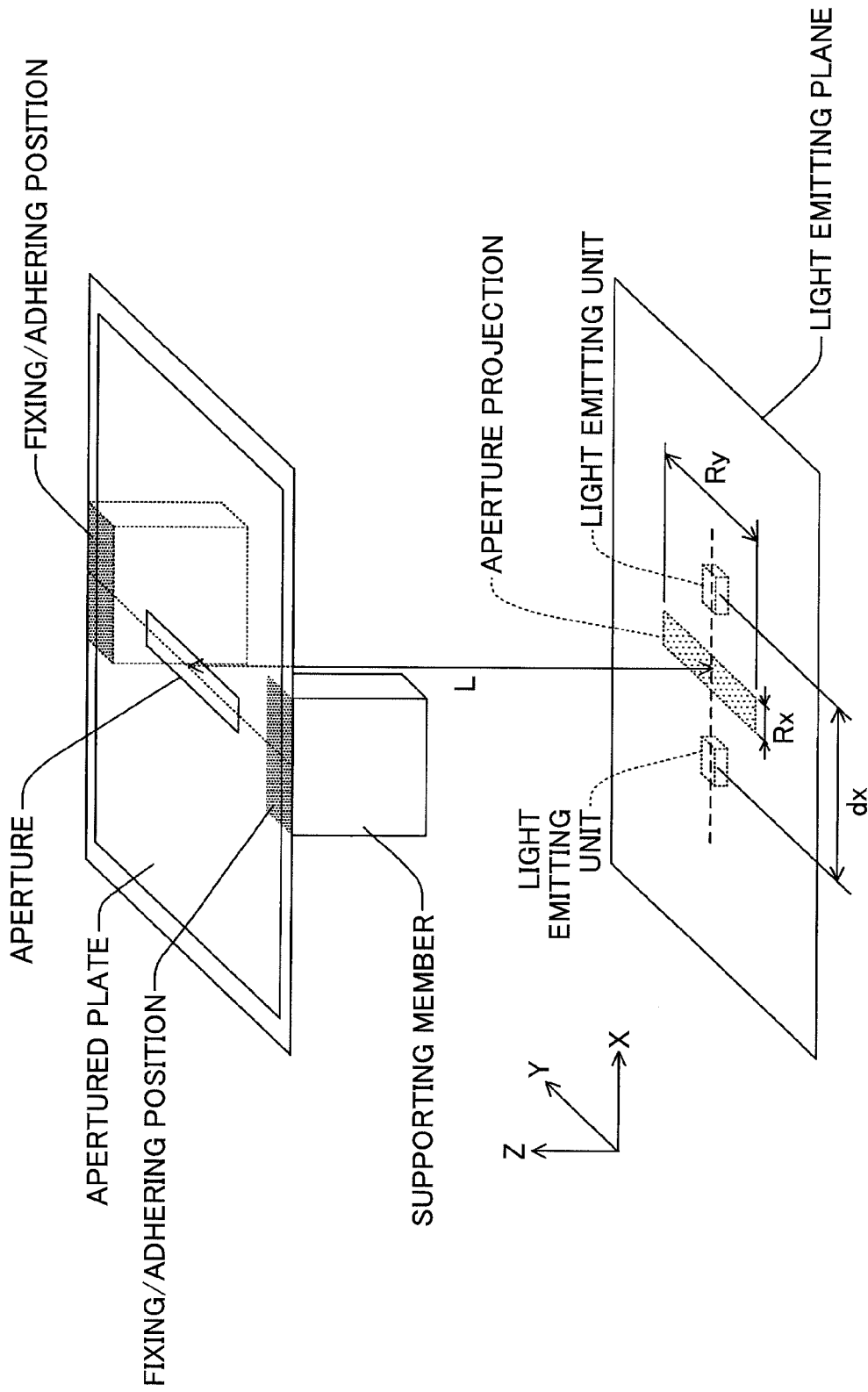
FIG. 26 is for describing a fixing example 2 according to an embodiment of the present invention.

FIG. 26 illustrates a fixing example 2 of fixing the apertured plate to the supporting member. In the fixing example 2, when fixing the apertured plate to the supporting member, a part of the +Y side and a part of the +Y side of the apertured plate are fixed to the supporting member with an adhesive. The areas in which the adhesive is applied are large enough for fixing the apertured plate to the supporting member.

In this example also, the amount of light beams passing through the aperture can be fixed regardless of the occurrence of interference patterns. It has been confirmed that with this example also, the variation in the amount of light is reduced compared to the case of a conventional configuration.

In the fixing example 2, two parts of sides of the apertured plate parallel to the X axis direction, which are facing each other across the aperture, are fixed to the supporting member by an adhesive.

Figure 27:
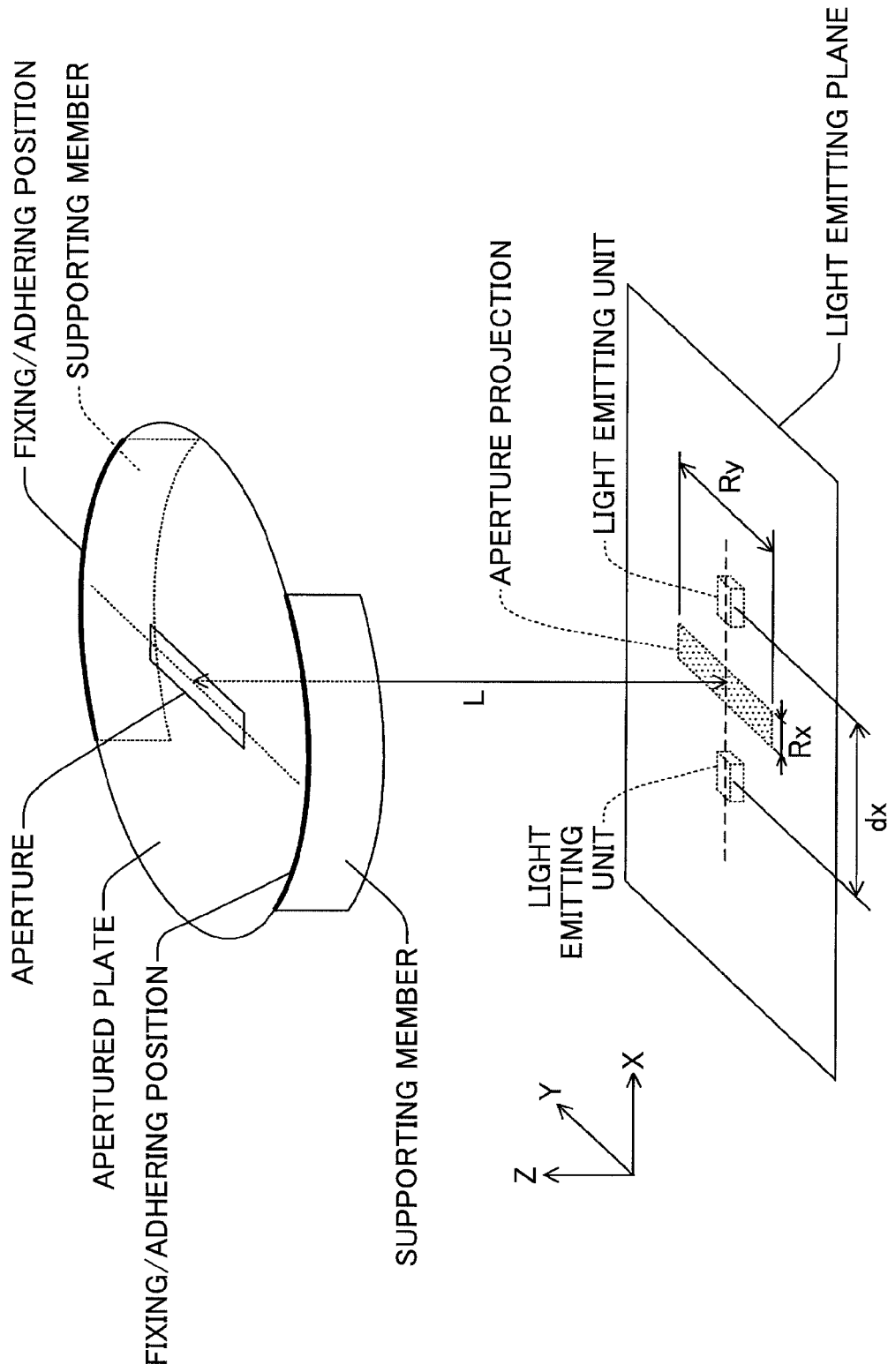
FIG. 27 illustrates a modification of the fixing example 2.

The shape of the apertured plate may be circular, as in the example shown in FIG. 27. In this example also, the amount of light beams passing through the aperture can be fixed regardless of the occurrence of interference patterns. It has been confirmed that with this example also, the variation in the amount of light is reduced compared to the case of a conventional configuration.

Fixing Example 3

Figure 28:
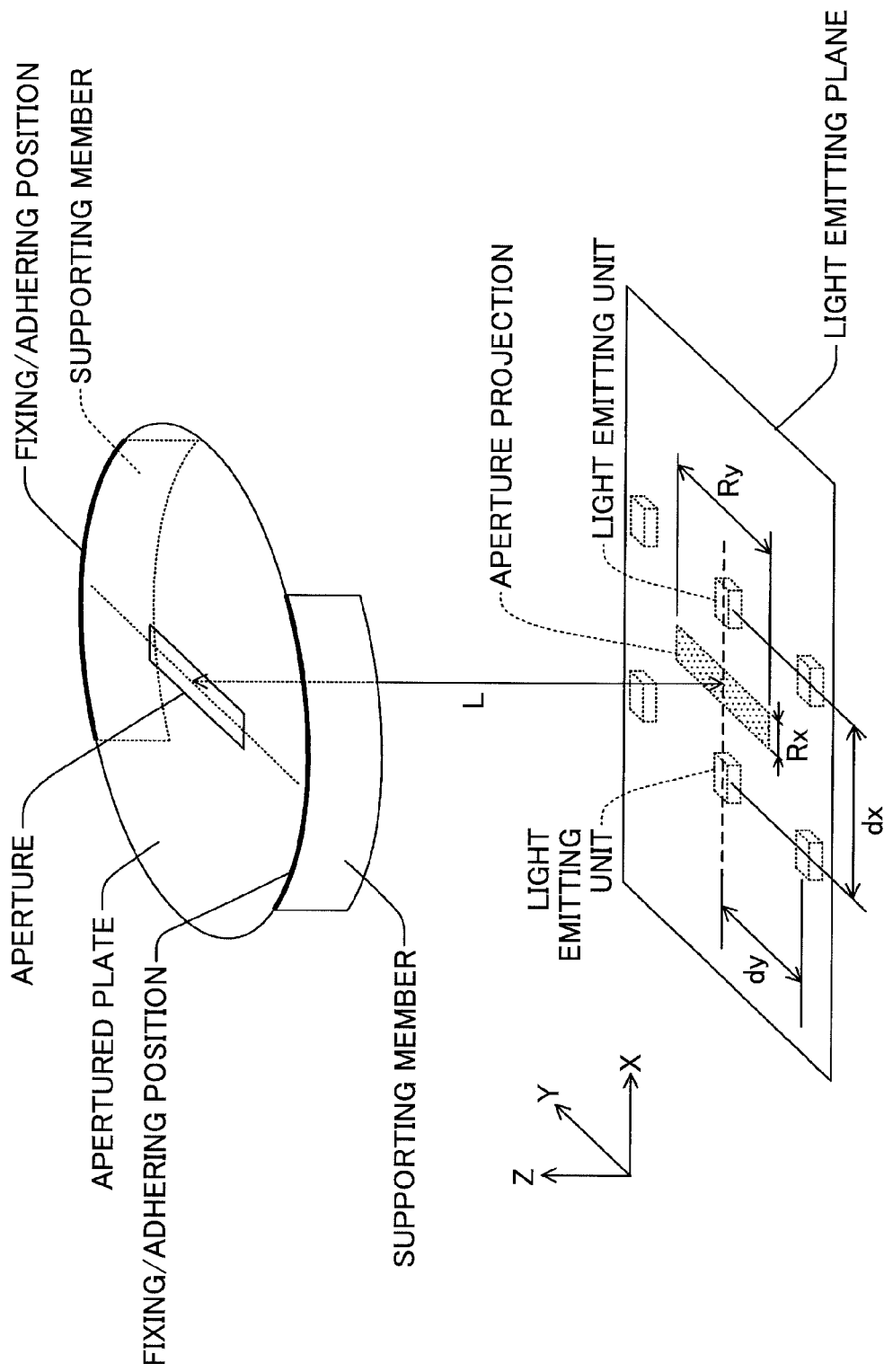
FIG. 28 is for describing a fixing example 3 according to an embodiment of the present invention.

FIG. 28 illustrates a fixing example 3 of fixing the apertured plate to the supporting member. In this example, plural light emitting units are arranged two-dimensionally in a matrix along an X axis direction and a Y axis direction.

The interval between light emitting units in the X axis direction is dx and the interval between light emitting units in the Y axis direction is dy. The length of the short side of the aperture projection on the light emitting plane is Rx, and the length of the long side of the aperture projection on the light emitting plane is Ry.

The specific sizes are dx=80 μm, dy=40 μm, L=100 mm, and λ=780 nm. Under these conditions, the interval between interference patterns is 0.975 mm in the X axis direction and 1.95 mm in the Y axis direction. Rx is 1.95 mm which is two times the interval between interference patterns in the X axis direction, and Ry is 7.80 mm which is four times the interval between interference patterns in the Y axis direction.

In the fixing example 3, the shape of the apertured plate is circular, and when fixing the apertured plate to the supporting member, a part of the +Y side of the circumference and a part of the −Y side of the circumference of the apertured plate are fixed to the supporting member with an adhesive. The areas in which the adhesive is applied are large enough for fixing the apertured plate to the supporting member.

The apertured plate is fixed to the supporting member such that between Rx and Ry, the length of Rx precisely becomes the desired length. This is because in the light beams cut out by the aperture, the fewer the number of interference patterns with respect to the length of the aperture, the greater the variation in the amount of light passing through the aperture when the positions of the interference patterns move.

In this example, variations in the amount of light can be reduced more if the length Rx of the aperture in the X axis direction having fewer interference patterns is set to be the desired length. Therefore, the apertured plate is fixed at two parts, i.e., at a part of the +Y side of the circumference and a part of the −Y side of the circumference of the apertured plate.

In this example also, the amount of light beams passing through the aperture can be fixed regardless of the occurrence of interference patterns. It has been confirmed that with this example also, the variation in the amount of light is reduced compared to the case of a conventional configuration.

In the fixing example 3, plural light emitting units are two-dimensionally arranged along an X axis direction and a Y axis direction. Either one of the part of the apertured plate in the X axis direction or the part of the apertured plate in the Y axis direction, which has larger intervals between interference patterns with respect to the size of the aperture, is fixed to the supporting member with an adhesive.

As described above, the light source unit 14 according to the present embodiment includes the laser module 500 including the laser chip 100, and the optical module 600 including the collimated lens 631 and the apertured plate 632.

The aperture in the apertured plate 632 is formed such that the length of the aperture projection in the X axis direction is two times the interval of interference patterns in the X axis direction.

Thus, the variation in the amount of light beams passing through the aperture can be reduced. Consequently, the light source unit 14 can stably emit light with few variations in the amount of light. Furthermore, the degree in freedom in designing the apertured plate 632 can be increased.

The optical scanning device 1010 according to the present embodiment includes the light source unit 14, and therefore optical scanning can be performed with high precision.

Furthermore, the laser chip 100 includes plural light emitting units, so that plural light scanning operations can be performed, and therefore image forming processes can be performed at high speed.

The laser printer 1000 according to the present embodiment includes the optical scanning device 1010, and consequently high quality images can be formed.

In the laser chip 100, the light emitting units are evenly spaced apart with intervals c, when the light emitting units are orthographically-projected on a virtual line extending in the sub scanning correspondence direction. Therefore, by adjusting the timings of lighting the light emitting units, the same configuration as that of light emitting units that are evenly spaced apart in the sub scanning direction can be attained on the photoconductive drum 1030.

For example, assuming that the interval c is 2.65 μm and the magnification ratio of the optical system of the optical scanning device 1010 is two times, images can be written with a high density of 4,800 dpi (dots per inch). As a matter of course, the density can be even more increased and printing of even higher quality can be performed by increasing the number of light emitting units in the main scanning correspondence direction, or by reducing the pitch dx in the sub scanning correspondence direction and reducing the intervals c even more in the array arrangement, or by reducing the magnification ratio of the optical system. The writing intervals in the main scanning direction can be easily controlled by adjusting the timings of lighting the light emitting units.

In this case, even if the dot writing density increases in the laser printer 1000, printing can be performed without decreasing the printing speed. Furthermore, when the dot writing density is the same (as the conventional technology), the printing speed can be increased even more.

In the above embodiment, the light emitting units have an oscillation wavelength of a 780 nm band; however, the present invention is not so limited. The oscillation wavelength of the light emitting units may be changed in accordance with properties of the photoconductor.

In the above embodiment, the optical scanning device 1010 is used in a printer; however, the optical scanning device 1010 may be used in an image forming apparatus other than a printer, such as a copier, a fax machine, or a multifunction peripheral in which these functions are combined.

In the above embodiment, the laser printer 1000 is described as the image forming apparatus; however, the present invention is not so limited.

For example, the image forming apparatus may directly radiate laser beams onto a medium (for example, a sheet) that develops colors by laser beams.

For example, the medium be may be a printing plate known as CTP (Computer to Plate). That is to say, the optical scanning device 1010 is also appropriately applied to an image forming apparatus that directly forms images by performing laser aberration on a printing plate material, to form printing plates.

Furthermore, the image forming apparatus may directly radiate laser beams onto a medium (for example, a sheet) that applies reversibility to colors by laser beams.

For example, the medium may be rewritable paper. For example, a material as described below is applied as a recording layer on a supporting body such as paper or a resin film. Then, by controlling the heat energy on the film with laser beams, reversibility is applied to the colors, so that colors are displayed or erased in a reversible manner.

Examples of rewritable marking methods are a transparent/opaque type rewritable marking method and a color-developing and decolorizing type rewritable marking method using leuco dye, and either method is applicable.

The transparent/opaque type rewritable marking method is performed by dispersing fine particles of fatty acid in a polymer thin film. When the film is heated with a temperature of greater than or equal to 110° C., the resin expands as the fatty acid melts. Subsequently, when the film is cooled, the fatty acid turns into a supercooled state and remains as a liquid, while the expanded resin solidifies. Subsequently, the fatty acid solidifies and contracts and turns into polycrystalline fine particles, and therefore gaps are formed between the resin and the fine particles. Light is scattered due to these gaps, and therefore the heated parts of the film appear to be white. Next, when the film is heated with an erasing temperature ranging between 80° C. and 110° C., the fatty acid partially melts, and the resin is expanded by heat, so that the gaps are filled. When the film is cooled in this state, the heated parts become transparent, and therefore the image is erased.

The rewritable marking method using leuco dye is performed by using the reversible color-developing and decolorizing reactions between colorless leuco dye and a decoloring agent having a long-chain alkyl group. When the medium is heated by a laser beam, the leuco dye and the decoloring agent react to each other so that a color is developed. Then, the medium is rapidly cooled so that the developed color is maintained. Then, the medium is heated and then slowly cooled, so that phase separation occurs due to the self-aggregating feature of the long-chain alkyl group of the decoloring agent. Accordingly, the leuco dye and the decoloring agent are physically separated from one another, and the color disappears.

Furthermore, the medium may be so-called color rewritable paper. Color rewritable paper is formed by providing various chemical compounds on a supporting body such as paper or a resin film. Examples of chemical compounds are a photochromic compound that develops a C (cyan) color in response to receiving ultraviolet rays and that erases the color in response to receiving a visible R (red) light, a photochromic compound that develops an M (magenta) color in response to receiving ultraviolet rays and that erases the color in response to receiving a visible G (green) light, and a photochromic compound that develops a Y (yellow) color in response to receiving ultraviolet rays and that erases the color in response to receiving a visible B (blue) light.

This medium can be made entirely black by radiating ultraviolet rays, and then expressing full-color images by adjusting the time length and intensity of R·G·B lights to control the color developing densities of three materials for developing Y·M·C colors. It is also possible to erase all three colors and make the medium entirely white, by continuously radiating intensive R·G·B lights.

An image forming apparatus that applies reversibility to colors by controlling the light energy as described above may be implemented as an image forming apparatus including an optical scanning device similar to that of the above embodiment.

Furthermore, the image forming apparatus may include an image carrier using a silver salt film. In this case, a latent image is formed on the silver salt film by optical scanning, and the latent image can be turned into a visible image by a process similar to a developing process that is performed in a typical silver salt photographic process. Furthermore, the image can be transferred onto a printing sheet by a process similar to a printing process that is performed in a typical silver salt photographic process. This type of image forming apparatus may be implemented as an optical plate-making device or an optical rendering device for rendering CT scan images.

Figure 29:
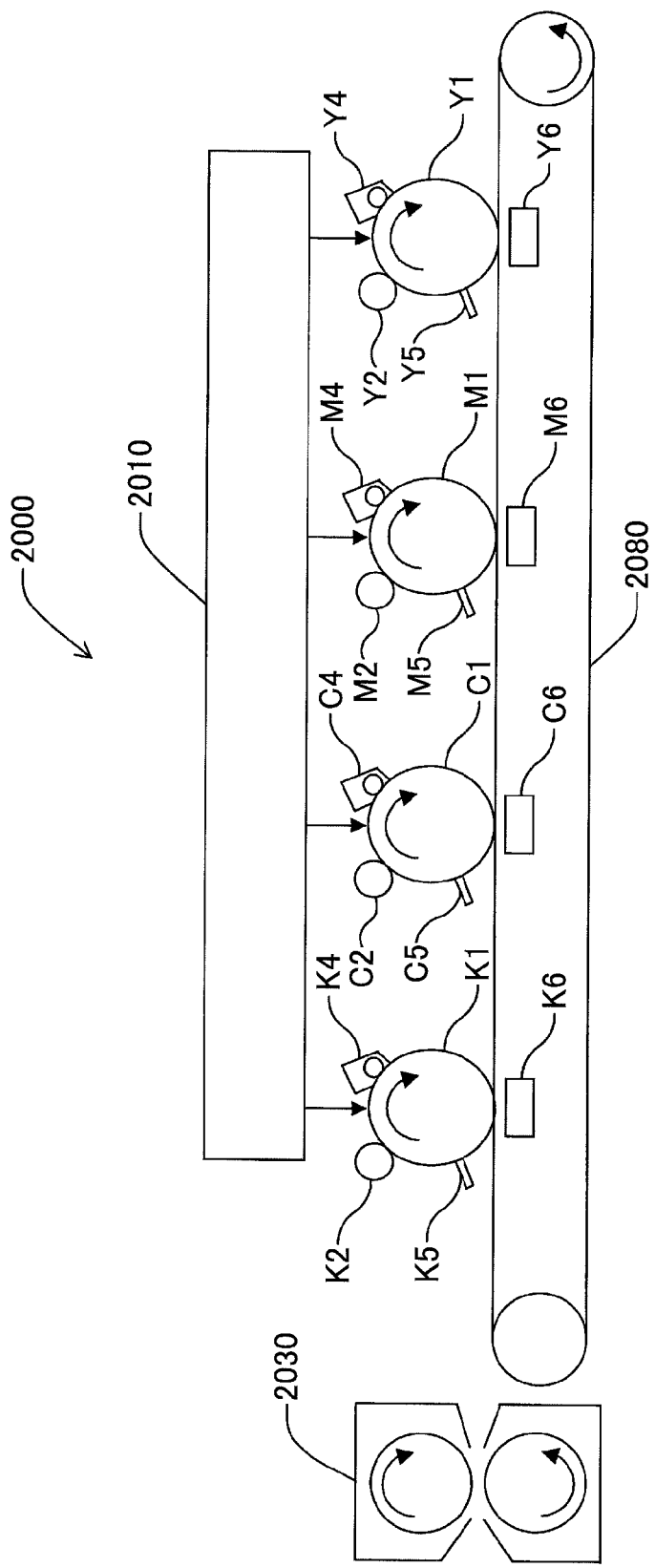
FIG. 29 is for describing a schematic configuration of a color printer.

Furthermore, as shown in an example of FIG. 29, the image forming apparatus may be a color printer 2000 including a plurality of photoconductive drums.

The color printer 2000 is a tandem-type multi-color printer that forms a full color image by superimposing four color (black (K), cyan (C), magenta (M), and yellow (Y)) images. The color printer 2000 includes a photoconductive drum K1, a charging unit K2, a developing unit K4, a cleaning unit K5, and a transferring unit K6 for black; a photoconductive drum C1, a charging unit C2, a developing unit C4, a cleaning unit C5, and a transferring unit C6 for cyan; a photoconductive drum M1, a charging unit M2, a developing unit M4, a cleaning unit M5, and a transferring unit M6 for magenta; and a photoconductive drum Y1, a charging unit Y2, a developing unit Y4, a cleaning unit Y5, and a transferring unit Y6 for yellow. Furthermore, the color printer 2000 includes an optical scanning device 2010, a transferring belt 2080, and a fixing unit 2030.

The photoconductive drums rotate in directions indicated by arrows in FIG. 29. The charging unit, the developing unit, the transferring unit, and the cleaning unit are arranged around each photoconductive drum in this order in a direction in which the photoconductive drum rotates. Each charging unit uniformly charges the surface of a corresponding photoconductive drum. The optical scanning device 2010 emits a light beam to the surface of each photoconductive drum charged by the corresponding charging unit, so that a latent image is formed on each photoconductive drum. Then, each latent image is developed into a toner image by a corresponding developing unit. Each toner image is transferred onto a recording sheet on the transferring belt 2080 by a corresponding transferring unit. Finally, the toner images transferred onto the recording sheet are fixed thereto by the fixing unit 2030.

The optical scanning device 2010 includes a light source similar to the light source 14 for each color. Therefore, the optical scanning device 2010 can have an effect similar to the optical scanning device 1010. Thus, the color printer 2000 can have an effect similar to the laser printer 1000.

In the color printer 2000, color shifts may occur due to manufacturing errors and positional errors in the components. Even when such errors occur, by selecting the light emitting units to be used for emitting light, the color shifts can be reduced.

As described above, the light source unit according to an embodiment of the present invention is appropriate for reducing variations in the amount of emitted light, even if a surface-emitting laser array and an apertured plate are used in combination. Furthermore, the optical scanning device according to an embodiment of the present invention is appropriate for performing optical scanning with high precision. Furthermore, the image forming apparatus according to an embodiment of the present invention is appropriate for forming high quality images.

The present invention is not limited to the specific embodiments described herein, and variations and modifications may be made without departing from the scope of the present invention.

The present application is based on Japanese Priority Patent Application No. 2010-103074, filed on Apr. 28, 2010 and Japanese Priority Patent Application No. 2011-035380, filed on Feb. 22, 2011, the entire contents of which are hereby incorporated herein by reference.

What is claimed is:

1. A light source unit comprising:
a surface-emitting laser array including light emitting units; and
an apertured member provided on a light path of light beams emitted from the surface-emitting laser array, the apertured member including an aperture, wherein
an orthogonal projection of the aperture on a plane including a light emitting area of the surface-emitting laser array has a length in one direction that is substantially an integral multiple of $\lambda L/d$, where $\lambda$ is an oscillation wavelength of the surface-emitting laser array, d is an interval between the light emitting units in the one direction, and L is a length of a vertical line extending from a center of the aperture to the plane.

2. The light source unit according to claim 1, wherein
the orthogonal projection of the aperture on the plane including the light emitting area of the surface-emitting laser array is a rectangular shape including a short side having a length R1 and a long side having a length R2, the long side being tilted by a tilt angle $\theta$ with respect to the one direction, and
at least one of $R1 \cdot \sin \theta$ and $R2 \cdot \cos \theta$ is substantially an integral multiple of $\lambda L/d$, where $\lambda$ is an oscillation wavelength of the surface-emitting laser array, d is an interval between the light emitting units in the one direction, and L is a length of a vertical line extending from a center of the aperture to the plane.

3. The light source unit according to claim 1, wherein
the light emitting units are arranged two-dimensionally in a first direction that is the one direction and a second direction intersecting the first direction, and
the orthogonal projection of the aperture on the plane has a length in the second direction that is substantially an integral multiple of $\lambda L/d_2$, where $d_2$ is an interval between the light emitting units in the second direction.

4. The light source unit according to claim 3, wherein
the first direction and the second direction are orthogonal to each other.

5. The light source unit according to claim 3, wherein
the first direction and the second direction are not orthogonal to each other.

6. The light source unit according to claim 1, wherein
the light emitting units are arranged two-dimensionally in a first direction that is the one direction and a second direction intersecting the first direction,
intervals between the light emitting units in the second direction are unequal, and
the orthogonal projection of the aperture on the plane has a length in the second direction that is a value between $\lambda L/d_{21} \times n$ and $\lambda L/d_{22} \times n$, where $d_{21}$ is a first interval between the light emitting units, $d_{22}$ is a second interval between the light emitting units, and n is an integer.

7. The light source unit according to claim 1, wherein
the apertured member includes plural apertured plates.

8. The light source unit according to claim 1, wherein
at least a part of the apertured member that is parallel to the one direction is fixed to a supporting member for fixing the apertured member to a plane including a light emitting area of the surface-emitting laser array.

9. The light source unit according to claim 1, wherein
the light emitting units are arranged two-dimensionally in a first direction that is the one direction and a second direction intersecting the first direction, and
a part of the apertured member is fixed with an adhesive to a supporting member for fixing the apertured member to a plane including a light emitting area of the surface-emitting laser array, wherein the part is parallel to either one of the first direction or the second direction that has larger intervals between the interference patterns with respect to a size of the aperture.

10. An optical scanning device for scanning a target surface with light beams, the optical scanning device comprising:
the light source unit according to claim 1;
a deflector that deflects light beams from the light source unit; and
a scanning optical system that condenses the light beams deflected by the deflector on the target surface.

11. An image forming apparatus comprising:
at least one image carrier; and
at least one of the optical scanning device according to claim 10 that scans the at least one image carrier with light beams that have been modulated based on image information.

12. The image forming apparatus according to claim 11, wherein
the image information is multicolor image information.

13. The light source unit according to claim 1, wherein
in at least one direction, an intensity distribution of interference patterns caused by the light beams passing through the aperture includes an equal number of constructively formed crest portions and destructively formed trough portions.

14. The light source unit according to claim 13, wherein
the interference patterns are caused by returning light reflected in the light path.

15. A light source unit comprising:
a surface-emitting laser array including light emitting units;
an apertured member provided on a light path of light beams emitted from the surface-emitting laser array, the apertured member including an aperture; and
a collimated lens that causes the light beams emitted from the surface-emitting laser array to become parallel light beams, the collimated lens being provided between the surface-emitting laser array and the apertured member, wherein
an orthogonal projection of the aperture on a plane including a light emitting area of the surface-emitting laser array has a length in the one direction that is substantially an integral multiple of $\lambda L/d$, where $\lambda$ is an oscillation wavelength of the surface-emitting laser array, d is an interval between the light emitting units in the one direction, and L is a length of a vertical line extending from a center of the collimated lens to the plane.

16. The light source unit according to claim 15, wherein
the orthogonal projection of the aperture on the plane including the light emitting area of the surface-emitting laser array is a rectangular shape including a short side having a length R1 and a long side having a length R2, the long side being tilted by a tilt angle $\theta$ with respect to the one direction, and
at least one of $R1 \cdot \sin \theta$ and $R2 \cdot \cos \theta$ is substantially an integral multiple of $\lambda L/d$, where $\lambda$ is an oscillation wavelength of the surface-emitting laser array, d is an interval between the light emitting units in the one direction, and L is a length of a vertical line extending from a center of the collimated lens to the plane.

17. The light source unit according to claim 15, wherein the apertured member is tilted or curved with respect to the plane.

18. A light source unit comprising:
a surface-emitting laser array including three or more light emitting units; and
an apertured member provided on a light path of light beams emitted from the surface-emitting laser array, the apertured member including an aperture, wherein
intervals between the three or more light emitting units are unequal in one direction, and
an orthogonal projection of the aperture on a plane including a light emitting area of the surface-emitting laser array, has a length in the one direction that is a value between $\lambda L/d1 \times n$ and $\lambda L/d2 \times n$, where d1 is a first interval between the three or more light emitting units, d2 is a second interval between the three or more light emitting units, $\lambda$ is an oscillation wavelength of the surface-emitting laser array, L is a length of a vertical line extending from a center of the aperture to the plane, and n is an integer.

19. A light source unit comprising:
a surface-emitting laser array including three or more light emitting units;
a collimated lens that causes light beams emitted from the surface-emitting laser array to become parallel light beams; and
an apertured member provided on a light path of the light beams that have passed through the collimated lens, the apertured member including an aperture, wherein
intervals between the three or more light emitting units are unequal in one direction, and
an orthogonal projection of the aperture on a plane including a light emitting area of the surface-emitting laser array, has a length in the one direction that is a value between $\lambda L/d1 \times n$ and $\lambda L/d2 \times n$, where d1 is a first interval between the three or more light emitting units, d2 is a second interval between the three or more light emitting units, $\lambda$ is an oscillation wavelength of the surface-emitting laser array, L is a length of a vertical line extending from a center of the collimated lens to the plane, and n is an integer.

* * * * *